(12) United States Patent
Harada

(10) Patent No.: US 11,760,130 B2
(45) Date of Patent: Sep. 19, 2023

(54) RUN-FLAT TIRE

(71) Applicant: The Yokohama Rubber Co., LTD., Tokyo (JP)

(72) Inventor: Shunya Harada, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 17/046,739

(22) PCT Filed: Feb. 14, 2019

(86) PCT No.: PCT/JP2019/005396
§ 371 (c)(1),
(2) Date: Oct. 9, 2020

(87) PCT Pub. No.: WO2019/198333
PCT Pub. Date: Oct. 17, 2019

(65) Prior Publication Data
US 2021/0162813 A1    Jun. 3, 2021

(30) Foreign Application Priority Data
Apr. 10, 2018 (JP) ................... 2018-075399

(51) Int. Cl.
*B60C 9/22* (2006.01)
*B60C 11/12* (2006.01)
*B60C 17/00* (2006.01)

(52) U.S. Cl.
CPC ............ *B60C 9/22* (2013.01); *B60C 11/1204* (2013.01); *B60C 17/00* (2013.01); *B60C 2009/2238* (2013.01)

(58) Field of Classification Search
CPC ......... B60C 9/22; B60C 11/1204; B60C 9/02; B60C 2009/2219; B60C 2009/2223
See application file for complete search history.

(56) References Cited

U.S. PATENT DOCUMENTS 5,368,082 A * 11/1994 Oare ...................... B60C 15/04
                                                                152/517
7,281,553 B1   10/2007 Roesgen et al.
(Continued)

FOREIGN PATENT DOCUMENTS

EP         0157716 A1 * 10/1985  ........... B60C 9/0064
JP         H11-310013      11/1999
(Continued)

OTHER PUBLICATIONS

Clark, Mechanics of Pneumatic Tires (Year: 1971).*
International Search Report for International Application No. PCT/JP2019/005396 dated May 14, 2019, 4 pages, Japan.

*Primary Examiner* — Cedrick S Williams
(74) *Attorney, Agent, or Firm* — THORPE NORTH & WESTERN

(57) ABSTRACT

A run-flat tire includes: sipes formed in blocks; a belt reinforcing layer on an outer side in a radial direction of a belt layer; and a side reinforcing rubber in sidewall portions, wherein a density of the sipes in a center block is from 0.10 cords/mm or greater to 0.30 cords/mm or smaller, the belt reinforcing layer includes a center reinforcing portion in which more center reinforcing portions are stacked at a center region than at positions other than the center region, a width Wc of the center reinforcing portion is within 0.5 Gr≤Wc≤2.5 Gr with respect to a thickness Gr of the side reinforcing rubber at the tire maximum width position, and an average width of the width Wc of the center reinforcing portion is from 50% or greater to 90% or smaller of a width of the center block.

11 Claims, 13 Drawing Sheets

(56) References Cited

U.S. PATENT DOCUMENTS

| | | | |
|---|---|---|---|
| 2003/0173011 A1* | 9/2003 | Tsuda | B60C 11/00 |
| | | | 152/531 |
| 2005/0194081 A1* | 9/2005 | Yano | B60C 3/00 |
| | | | 152/527 |
| 2005/0211361 A1* | 9/2005 | Nagahara | B60C 17/0009 |
| | | | 152/554 |
| 2006/0162837 A1 | 7/2006 | Sakaguchi et al. | |
| 2009/0165916 A1 | 7/2009 | Sugitani et al. | |
| 2011/0214788 A1* | 9/2011 | Chambriard | B60C 9/20 |
| | | | 152/209.1 |
| 2015/0013865 A1* | 1/2015 | Yoshikawa | B60C 11/1236 |
| | | | 152/209.18 |
| 2015/0251496 A1* | 9/2015 | Yamaguchi | B60C 5/12 |
| | | | 152/209.18 |
| 2016/0257168 A1* | 9/2016 | Kuwayama | B60C 9/02 |
| 2016/0257169 A1* | 9/2016 | Kuwayama | B60C 11/0306 |
| 2018/0086147 A1* | 3/2018 | Morii | B60C 11/12 |
| 2018/0186193 A1* | 7/2018 | Kitani | B60C 11/1281 |

FOREIGN PATENT DOCUMENTS

| | | |
|---|---|---|
| JP | 2000-142035 | 5/2000 |
| JP | 2003-516895 | 5/2003 |
| JP | 2003-341308 | 12/2003 |
| JP | 2004-322718 | 11/2004 |
| JP | 2004-359145 | 12/2004 |
| JP | 2006-199224 | 8/2006 |
| JP | 2006327256 A * | 12/2006 |
| JP | 2011-195046 | 10/2011 |
| JP | 4865259 | 2/2012 |
| JP | 2013-220718 | 10/2013 |
| WO | WO 01/43994 | 6/2001 |
| WO | WO 2007/086436 | 8/2007 |

* cited by examiner

| | CONVENTIONAL EXAMPLE | COMPARATIVE EXAMPLE 1 | COMPARATIVE EXAMPLE 2 | COMPARATIVE EXAMPLE 3 | COMPARATIVE EXAMPLE 4 | EXAMPLE 1 | EXAMPLE 2 | EXAMPLE 3 |
|---|---|---|---|---|---|---|---|---|
| PRESENCE/ABSENCE OF CENTER REINFORCING PORTION OF BELT REINFORCING LAYER | NO | YES | YES | YES | YES | YES | YES | YES |
| WIDTH Wc OF CENTER REINFORCING PORTION WITH RESPECT TO THICKNESS Gr OF SIDE REINFORCING RUBBER | - | 0.4 | 3.0 | 1.3 | 1.3 | 1.3 | 1.3 | 1.3 |
| DENSITY OF SIPES IN CENTER BLOCK [CORDS/mm] | 0.17 | 0.17 | 0.17 | 0.9 | 0.31 | 0.17 | 0.17 | 0.17 |
| AVERAGE WIDTH OF CENTER REINFORCING PORTION WITH RESPECT TO WIDTH OF CENTER BLOCK | - | 40% | 95% | 70% | 70% | 70% | 70% | 70% |
| FORM OF CENTER REINFORCING PORTION | - | PROTRUDING OUTWARD | PROTRUDING INWARD | PROTRUDING INWARD | PROTRUDING INWARD | PROTRUDING OUTWARD | PROTRUDING INWARD | PROTRUDING INWARD |
| WIDTH Ws OF CENTER REINFORCING PORTION WITH RESPECT TO WIDTH Ws OF DEEP BOTTOM PORTION OF SIPE | - | 50% | 50% | 50% | 50% | 50% | 45% | 50% |
| THICKNESS Tu OF UNDERTREAD WITH RESPECT TO THICKNESS Tc OF TREAD RUBBER LAYER | 40% | 40% | 40% | 40% | 40% | 40% | 40% | 40% |
| Tg/Tc | 0.2 | 0.2 | 0.2 | 0.2 | 0.2 | 0.2 | 0.2 | 0.2 |
| SHOCK BURST RESISTANCE | 100 | 101 | 106 | 101 | 105 | 103 | 102 | 104 |
| PERFORMANCE ON ICE | 100 | 100 | 98 | 105 | 96 | 100 | 100 | 100 |

FIG. 12A

| | EXAMPLE 4 | EXAMPLE 5 | EXAMPLE 6 | EXAMPLE 7 | EXAMPLE 8 | EXAMPLE 9 | EXAMPLE 10 | EXAMPLE 11 |
|---|---|---|---|---|---|---|---|---|
| PRESENCE/ABSENCE OF CENTER REINFORCING PORTION OF BELT REINFORCING LAYER | YES | YES | YES | YES | YES | YES | YES | YES |
| WIDTH Wc OF CENTER REINFORCING PORTION WITH RESPECT TO THICKNESS Gr OF SIDE REINFORCING RUBBER | 1.3 | 1.3 | 1.3 | 1.3 | 1.3 | 1.3 | 1.3 | 1.3 |
| DENSITY OF SIPES IN CENTER BLOCK [CORDS/mm] | 0.17 | 0.22 | 0.22 | 0.22 | 0.22 | 0.22 | 0.22 | 0.22 |
| AVERAGE WIDTH OF CENTER REINFORCING PORTION WITH RESPECT TO WIDTH OF CENTER BLOCK | 50% | 50% | 50% | 50% | 50% | 50% | 50% | 50% |
| FORM OF CENTER REINFORCING PORTION | PROTRUDING INWARD | PROTRUDING INWARD | PROTRUDING INWARD | PROTRUDING INWARD | PROTRUDING INWARD | PROTRUDING INWARD | PROTRUDING INWARD | PROTRUDING INWARD |
| WIDTH Wc OF CENTER REINFORCING PORTION WITH RESPECT TO WIDTH Ws OF DEEP BOTTOM PORTION OF SIPE | 50% | 50% | 65% | 65% | 65% | 65% | 65% | 65% |
| THICKNESS Tu OF UNDERTREAD WITH RESPECT TO THICKNESS Tc OF TREAD RUBBER LAYER | 40% | 40% | 40% | 85% | 60% | 60% | 60% | 60% |
| Tg/Tc | 0.2 | 0.2 | 0.2 | 0.2 | 0.10 | 0.45 | 0.2 | 0.25 |
| SHOCK BURST RESISTANCE | 103 | 102 | 103 | 106 | 103 | 106 | 104 | 105 |
| PERFORMANCE ON ICE | 100 | 103 | 103 | 101 | 102 | 101 | 103 | 103 |

FIG. 12B

RUN-FLAT TIRE

TECHNICAL FIELD

The present technology relates to a run-flat tire.

BACKGROUND ART

Pneumatic tires are assembled on rims and mounted on a vehicle in a state of being internally inflated with air. When a vehicle is traveling, it is this internal air pressure that bears the load. However, upon puncture or the like, air escapes from the pneumatic tire, rendering the tire unsuitable to bear the load. Specifically, a load supported by the air pressure comes to be supported by the sidewall portions, causing the sidewall portions to greatly deform. As a result, travel is impeded. Therefore, as a pneumatic tire capable of so-called run-flat travel wherein a vehicle travels with the air escaping due to a puncture or the like, a run-flat tire provided with a side reinforcing rubber on an inner side of the sidewall portions to increase the bending rigidity of the sidewall portions are known. In other words, the run-flat tire allows travel by suppressing deformation of the sidewall portions to be performed, even in a case in which the air filled therein escapes and a large load acts on the sidewall portions.

Since the run-flat tire is provided with the side reinforcing rubber in this manner, run-flat travel can be performed even when the air filled therein escapes. However, the steering stability at that time is inferior to the steering stability when the internal pressure is filled. Therefore, some run-flat tires in the related are have ensured steering stability during run-flat travel. For example, in a run-flat tire described in Japan Unexamined Patent Publication No. 2003-341308, steering stability during run-flat travel is improved by disposing a suppressing member for suppressing a tread lift in a tread portion.

In a pneumatic tire such as a run-flat tire, a tread portion may be damaged when treading on a projection such as a stone on a road surface when a vehicle travels, which may cause shock bursts. Therefore, some pneumatic tires in the related art have improved durability against such a projection. For example, a pneumatic tire described in Japan Patent No. 4865259 improves projection resistance in such a way that two belt protecting layers are disposed on an outer side in a tire radial direction of a belt layer, and the belt protecting layer on the outer side in the tire radial direction has a narrower width than the belt protecting layer on an inner side in the tire radial direction.

Here, although the run-flat tire allows a vehicle to travel in a non-inflated state by disposing the side reinforcing rubber inside the sidewall portion, since the run-flat tire increases the rigidity of the sidewall portion, shock bursts are likely to occur in a normal internal pressure state. That is, in a general pneumatic tire that does not have a side reinforcing rubber, when a tread portion treads on a projection, since the sidewall portion as well as the tread portion deflects, the pressing force from the projection against the tread portion can be reduced. However, since the rigidity of the sidewall portion of the run-flat tire is high, the sidewall portion does not easily deflect when the tread portion treads on a projection. Therefore, when the run-flat tire treads on a projection, the load from the projection on the tread portion is less likely to be reduced, compared to a case where a general pneumatic tire treads on a projection.

Particularly, in a so-called studless tire, which is a pneumatic tire for which running performance on ice or snow is required, since the hardness of a cap rubber is low, and many sipes are formed in blocks, shock bursts are more likely to occur in run-flat tires of studless tires. In other words, the studless tire enhances adhesion frictional force by using relatively soft rubber in the cap rubber that forms the ground contact surface of the tread portion, in addition to by providing a number of sipes in the blocks of the tread portion, to enhance the running performance on ice and snow. However, when the hardness of the cap rubber is decreased and a number of sipes are provided in the tread portion, since block rigidity decreases, shock bursts are likely to occur.

On the other hand, when the hardness of the cap rubber is increased and the number of sipes is decreased in order to improve the shock burst resistance performance, since the block rigidity increases, shock bursts do not easily occur, but running performance on ice will decrease. Therefore, in the run-flat tires of studless tires, it is very difficult to achieve both the shock burst resistance and the performance on ice.

SUMMARY

The present technology provides a run-flat tire capable of improving the shock burst resistance without degrading the performance on ice.

A run-flat tire according to an embodiment of the present technology includes: a tread portion; a plurality of blocks defined in the tread portion by a plurality of main grooves and a plurality of lug grooves formed in the tread portion; a plurality of sipes formed in the plurality of blocks to extend in a tire width direction; a sidewall portion disposed on both sides in the tire width direction of the tread portion; a belt layer disposed in the tread portion; a belt reinforcing layer disposed on an outer side in a tire radial direction of the belt layer; a tread rubber layer disposed on an outer side in the tire radial direction of the belt reinforcing layer in the tread portion; and a side reinforcing rubber disposed in the sidewall portion, a density in a tire circumferential direction of the plurality of sipes formed in a center block which is the block closest to a tire equatorial plane among the plurality of blocks being larger than a density in the tire circumferential direction of the plurality of sipes formed in shoulder blocks which are the blocks located on outermost sides in the tire width direction, a density in the tire circumferential direction of the plurality of sipes formed in the center blocks being within a range from 0.10 cords/mm or greater to 0.30 cords/mm or smaller, a width in the tire width direction of the center block being within a range from 7% or greater to 20% or smaller of a development width of the tread portion, the belt reinforcing layer including a center reinforcing portion, which is a portion in which more belt reinforcing layers are stacked at a position of a center region, which is a region in the tire width direction where the center block is located, than at positions other than the center region, a width Wc in the tire width direction of the center reinforcing portion of the belt reinforcing layer being within a range of $0.5\ Gr \leq Wc \leq 2.5\ Gr$ with respect to a thickness Gr of the side reinforcing rubber at a tire maximum width position, and an average width of the width Wc of the center reinforcing portion being within a range from 50% or greater to 90% or smaller of a width in the tire width direction of the center block.

Preferably, in the run-flat tire described above, the center reinforcing portion of the belt reinforcing layer is formed so as to protrude to an inner side in the tire radial direction.

Preferably, in the run-flat tire described above, the tread rubber layer includes: a cap tread and an undertread disposed on an inner side in the tire radial direction of the cap tread, and a modulus at 300% elongation of the cap tread is within a range from 4.0 MPa or greater to 10.0 MPa or smaller, and a modulus at 300% elongation of the undertread is within a range from 10.0 MPa or greater to 15.0 MPa or smaller.

Preferably, in the run-flat tire described above, a thickness of the undertread in the tire radial direction at a position of the center block is within a range from 50% or greater to 80% or smaller of a thickness of the tread rubber layer in the tire radial direction at the position of the center block.

Preferably, in the run-flat tire described above, the center reinforcing portion is disposed to overlap a deepest depth position of the plurality of sipes formed in the center blocks in the tire radial direction.

Preferably, in the run-flat tire described above, the tread portion is configured such that a relationship between a minimum thickness Tg of a rubber thickness between the belt reinforcing layer and a groove bottom of the plurality of main grooves defining the center block and an average thickness Tc of the tread rubber layer, in the center block, on the outer side in the tire radial direction of the belt reinforcing layer is within a range of $0.12 \leq (Tg/Tc) \leq 0.4$.

The run-flat tire according to an embodiment of the present technology can improve the shock burst resistance without degrading the performance on ice.

BRIEF DESCRIPTION OF DRAWINGS

FIG. 12A is a table illustrating results of performance evaluation tests of run-flat tires.

FIG. 12B is a table illustrating results of performance evaluation tests of run-flat tires.

DETAILED DESCRIPTION

Figure 1:
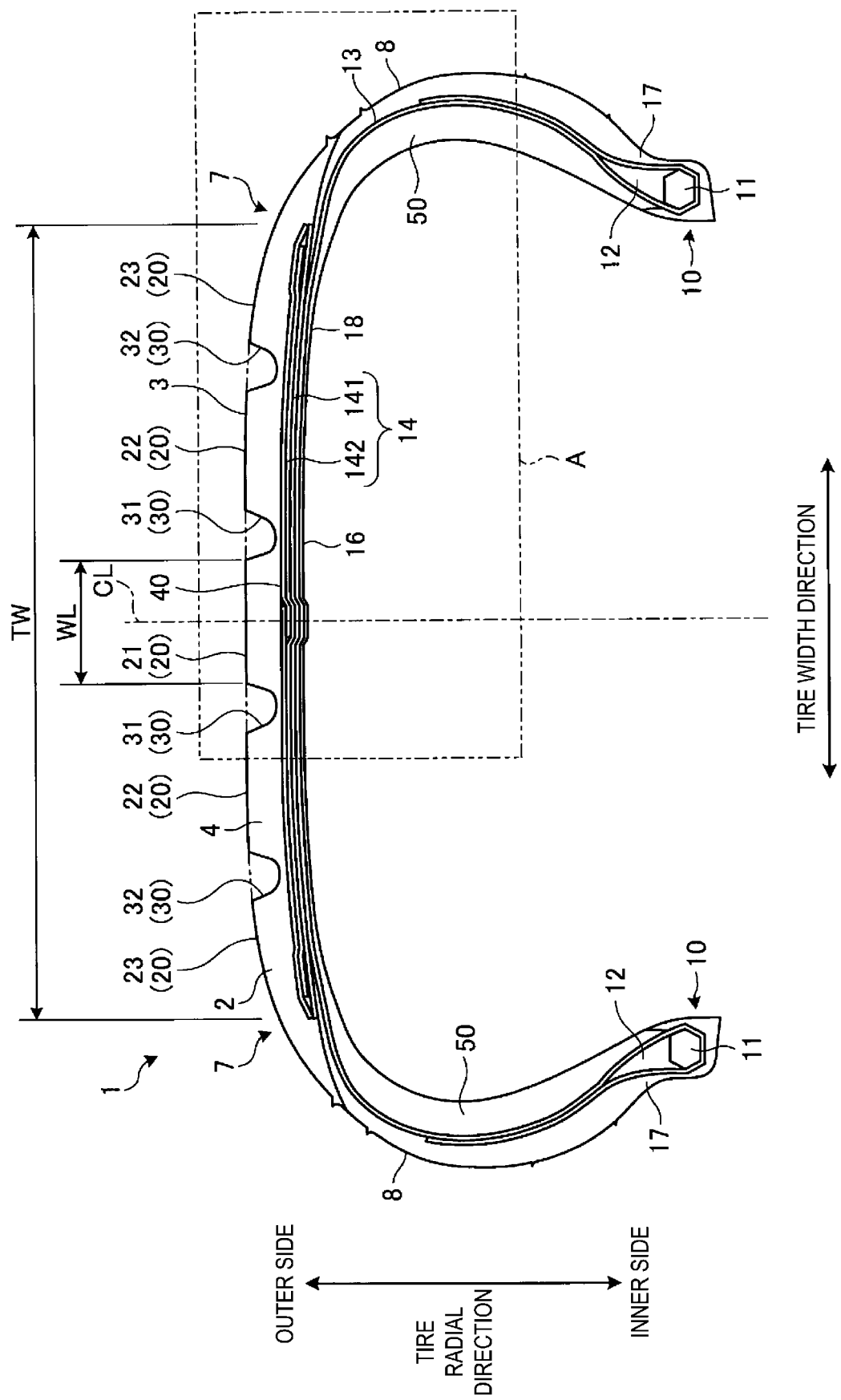
FIG. 1 is a meridian cross-sectional view illustrating main portions of a run-flat tire according to an embodiment.

A run-flat tire according to an embodiment of the present technology is described in detail below with reference to the drawings. However, an embodiment of the present technology is not limited by the embodiment. Constituents of the following embodiment include components that are substantially identical or that can be substituted or easily conceived by one skilled in the art.

Embodiment

Herein, "tire radial direction" refers to a direction orthogonal to a rotation axis (not illustrated in the drawings) of a run-flat tire 1. "Inner side in the tire radial direction" refers to a side toward the rotation axis in the tire radial direction. "Outer side in the tire radial direction" refers to a side away from the rotation axis in the tire radial direction. "Tire circumferential direction" refers to a circumferential direction about the rotation axis. Moreover, "tire width direction" refers to a direction parallel to the rotation axis, "inner side in the tire width direction" refers to a side toward a tire equatorial plane (tire equator line) CL in the tire width direction, and "outer side in the tire width direction" refers to a side away from the tire equatorial plane CL in the tire width direction. "Tire equatorial plane CL" refers to a plane orthogonal to the rotation axis of the run-flat tire 1, the plane passing through the center of the tire width of the run-flat tire 1, and a position of "tire equatorial plane CL" in the tire width direction is identical to a tire width direction centerline which is the center position in the tire width direction of the run-flat tire 1. "Tire width" is a width in the tire width direction between portions located on the outermost sides in the tire width direction, or in other words, the distance between portions that are the most distant from the tire equatorial plane CL in the tire width direction. "Tire equator line" refers to a line along the tire circumferential direction of the run-flat tire 1 that lies on the tire equatorial plane CL.

FIG. 1 is a meridian cross-sectional view illustrating main portions of a run-flat tire 1 according to an embodiment. In the run-flat tire 1 according to an embodiment of the present embodiment, a tread portion 2 is disposed on a portion on the outermost side in the tire radial direction when viewed in a meridian cross-section, and the tread portion 2 includes a tread rubber layer 4 formed from a rubber composition. The surface of the tread portion 2, that is, the portion in contact with the road surface during traveling of a vehicle (not illustrated) having the run-flat tire 1 mounted thereon is formed as a ground contact surface 3, and the ground contact surface 3 forms a part of the contour of the run-flat tire 1. A plurality of main grooves 30 extending in the tire circumferential direction and a plurality of lug grooves 33 (see FIG. 5) extending in the tire width direction are formed in the ground contact surface 3 of the tread portion 2, and a plurality of blocks 20 which are land portions are formed in the ground contact surface 3 by the main grooves 30 and the lug grooves 33. In the present embodiment, four main grooves 30 are formed side by side in the tire width direction, and each two of the four main grooves 30 are disposed on both sides in the tire width direction of the tire equatorial plane CL. In other words, the four main grooves 30 in total are formed in the tread portion 2, including: two center main grooves 31 disposed on both sides of the tire equatorial plane CL; and two shoulder main grooves 32 disposed on an outer side in the tire width direction of each of the two center main grooves 31.

Note that "main groove 30" refers to a vertical groove in which at least a part is extending in the tire circumferential direction. In general, the main groove 30 has a groove width of 3.0 mm or greater and a groove depth of 6.5 mm or greater and has a tread wear indicator (slip sign) therein, indicating terminal stages of wear. In the present embodiment, the main groove 30 has a groove width of 3.0 mm or greater and 10.0 mm or smaller and a groove depth of 8.0 mm or greater and 11.0 mm or smaller and is substantially parallel to the tire equator line (centerline) where the tire equatorial plane CL and the ground contact surface 3 intersect. The main grooves 30 may extend linearly in the tire circumferential direction or may be provided in a wave shape or a zigzag shape.

Among the blocks 20 defined by the main grooves 30 and the lug grooves 33, the block 20 located between two center main grooves 31 and located on the tire equatorial plane CL is a center block 21. Moreover, blocks 20 located between adjacent sets of the center main groove 31 and the shoulder main groove 32 and disposed on an outer side in the tire width direction of the center block 21 are second blocks 22. Moreover, blocks 20 that are located on an outer side in the tire width direction of the second block 22 and are adjacent to the second blocks 22 with the shoulder main groove 32 disposed therebetween are shoulder blocks 23. The shoulder blocks 23 are the blocks 20 located on the outermost sides in the tire width direction.

Among these blocks, a width WL in the tire width direction of the center block 21 is within a range from 7% or greater to 20% or smaller of a developed tread width TW which is the development width of the tread portion 2. "developed tread width TW" refers to a linear distance between both ends of the tread portion 2 of the run-flat tire 1 in a developed view, measured in a no-load state, in which the run-flat tire 1 is mounted on a regular rim and is inflated to the regular internal pressure and in which no load is applied to the run-flat tire 1. Here, "regular rim" refers to a "standard rim" defined by JATMA (The Japan Automobile Tyre Manufacturers Association, Inc.), a "Design Rim" defined by TRA (The Tire and Rim Association, Inc.), or a "Measuring Rim" defined by ETRTO (The European Tyre and Rim Technical Organisation). Moreover, "regular internal pressure" refers to a "maximum air pressure" defined by JATMA, the maximum value described in "TIRE LOAD LIMITS AT VARIOUS COLD INFLATION PRESSURES" defined by TRA, or "INFLATION PRESSURES" defined by ETRTO.

Shoulder portions 7 are located at both ends on outer sides in the tire width direction of the tread portion 2, and sidewall portions 8 are disposed on inner sides in the tire radial direction of the shoulder portions 7. In other words, the sidewall portions 8 are disposed on both sides in the tire width direction of the tread portion 2. In other words, the sidewall portions 8 are disposed at two sections on both sides in the tire width direction of the run-flat tire 1 and form the portions exposed to the outermost sides in the tire width direction of the run-flat tire 1.

A bead portion 10 is located on an inner side in the tire radial direction of each of the sidewall portions 8 located on both sides in the tire width direction. Similarly to the sidewall portions 8, the bead portions 10 are disposed at two sections on both sides of the tire equatorial plane CL. That is, a pair of the bead portions 10 is disposed on both sides in the tire width direction of the tire equatorial plane CL. Each bead portion 10 is provided with a bead core 11, and a bead filler 12 is provided on an outer side in the tire radial direction of the bead core 11. The bead core 11 is an annular member formed by winding a bead wire which is a steel wire in a ring shape, and the bead filler 12 is a rubber member disposed on the outer side in the tire radial direction of the bead core 11.

A plurality of belt layers 14 is provided on an inner side in the tire radial direction of the tread portion 2. The belt layer 14 is formed by a multilayer structure in which at least two layers of cross belts 141 and 142 are stacked. The cross belts 141 and 142 are formed by rolling and covering, with coating rubber, belt cords made from steel or an organic fiber material such as polyester, rayon, or nylon, and a belt angle defined as an inclination angle of the belt cords with respect to the tire circumferential direction is within a predetermined range (for example, from 20° or greater to 55° or smaller). Furthermore, the belt angles of the two layers of cross belts 141 and 142 are different from each other. Due to this, the belt layer 14 is configured as a so-called crossply structure in which two layers of cross belts 141 and 142 are stacked with the inclination directions of the belt cords intersecting each other.

A belt reinforcing layer 40 is disposed on an outer side in the tire radial direction of the belt layer 14. The belt reinforcing layer 40 is disposed on the outer side in the tire radial direction of the belt layer 14 and covers the belt layer 7 in the tire circumferential direction. The belt reinforcing layer 40 is formed by covering, with coating rubber, a plurality of cords (not illustrated) disposed side by side in the tire width direction and substantially parallel to the tire circumferential direction. The cords of the belt reinforcing layer 40 are made from steel or an organic fiber such as polyester, rayon, or nylon, and the cord angle is within a range of ±5° with respect to the tire circumferential direction. Moreover, in the cords of the belt reinforcing layer 40, a wire diameter which is the diameter of a cord is within a range from 0.4 mm or greater to 1.0 mm or smaller, and a cord count per 50 mm in an arrangement direction of the cord is within a range from 30 or greater to 45 or smaller. In the present embodiment, the belt reinforcing layer 40 is disposed across the entire region of the range in the tire width direction in which the belt layer 14 is disposed and covers end portions in the tire width direction of the belt layer 14. The tread rubber layer 4 of the tread portion 2 is disposed on an outer side in the tire radial direction of the belt reinforcing layer 40 in the tread portion 2.

A carcass layer 13 containing the cords of radial plies is continuously provided on an inner side in the tire radial direction of the belt layer 14 and on a side of the sidewall portion 8 close to the tire equatorial plane CL. The carcass layer 13 has a single layer structure made of one carcass ply or a multilayer structure made of a plurality of carcass plies, and spans between the pair of bead portions 10 disposed on both sides in the tire width direction in a toroidal shape to form the framework of the tire. Specifically, the carcass layer 13 is disposed to span from one bead portion 10 to the other bead portion 10 among the pair of bead portions 10 located on both sides in the tire width direction and turns back toward the outer side in the tire width direction along the bead cores 11 at the bead portions 10 so as to wrap around the bead cores 11 and the bead fillers 12. The bead filler 12 is a rubber member disposed in a space formed on the outer side in the tire radial direction of the bead core 11 when the carcass layer 13 is folded back at the bead portion 10. Moreover, the belt layer 14 is disposed on the outer side in the tire radial direction of a portion, located in the tread portion 2, of the carcass layer 13 spanning between the pair of bead portions 10. Moreover, the carcass ply of the carcass layer 13 is made by rolling and covering, with coating rubber, a plurality of carcass cords made from steel or an organic fiber material such as aramid, nylon, polyester, or rayon. The plurality of carcass cords that form the carcass ply are disposed side by side with an angle in the tire circumferential direction, the angle with respect to the tire circumferential direction following a tire meridian direction.

At the bead portion 10, a rim cushion rubber 17 is disposed on an inner side in the tire radial direction and an outer side in the tire width direction of the bead core 11 and a turned back portion of the carcass layer 13, the rim cushion rubber 17 forming a contact surface of the bead portion 10 against the rim flange. Moreover, an innerliner 16 is formed along the carcass layer 13 on the inner side of the carcass layer 13 or on the inner side of the carcass layer 13 in the run-flat tire 1. The innerliner 16 forms a tire inner surface 18 that is a surface on an inner side of the run-flat tire 1.

Moreover, a side reinforcing rubber 50 is disposed in the sidewall portion 8. The side reinforcing rubber 50 is a rubber member provided inside the sidewall portion 8 and is disposed so as not to be exposed to the tire inner surface and the tire outer surface. Specifically, the side reinforcing rubber 50 is located mainly on an inner side in the tire width direction of a portion, located in the sidewall portion 8, of the carcass layer 13 and is disposed between the carcass layer 13 and the innerliner 16 in the sidewall portion 8, and a shape in a meridian cross-section of the run-flat tire 1 is formed in a crescent shape that protrudes to the outer side in the tire width direction.

Figure 2:
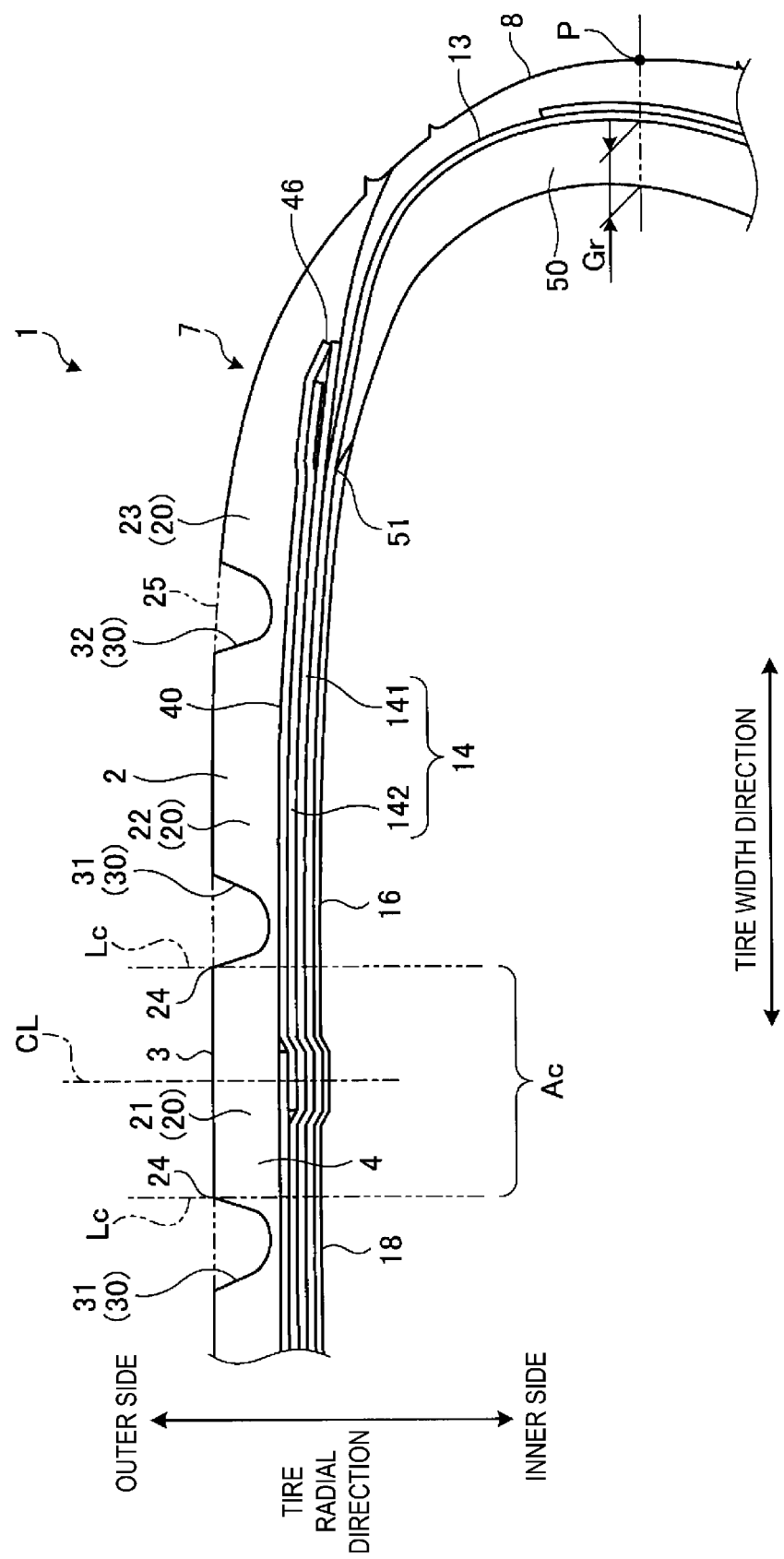
FIG. 2 is a detailed view of a portion A of FIG. 1.

FIG. 2 is a detailed view of portion A of FIG. 1. The side reinforcing rubber 50 formed in a crescent shape has an outer end portion 51, which is an end portion on the outer side in the tire radial direction, located on the inner side in the tire radial direction of the belt layer 14 in the tread portion 2, and the side reinforcing rubber 50 and the belt layer 14 are disposed such that a part overlaps in the tire radial direction with an amount of the overlap within a predetermined range. The side reinforcing rubber 50 disposed in this manner is formed of a rubber material having higher strength than the rubber that forms the sidewall portion 8 and the rim cushion rubber 17 that is disposed in the bead portion 10 (see FIG. 1).

Figure 3:
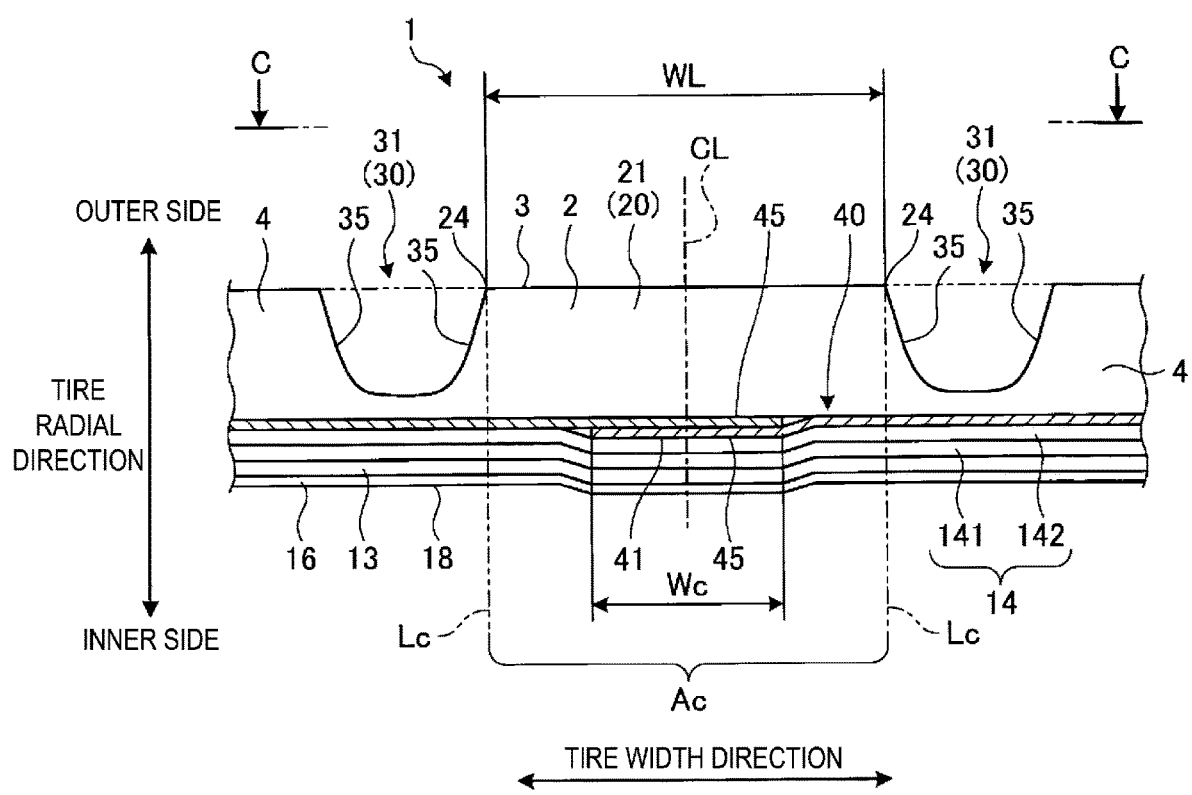
FIG. 3 is a detailed view at or near a center block of a tread portion illustrated in FIG. 2.
Figure 4:
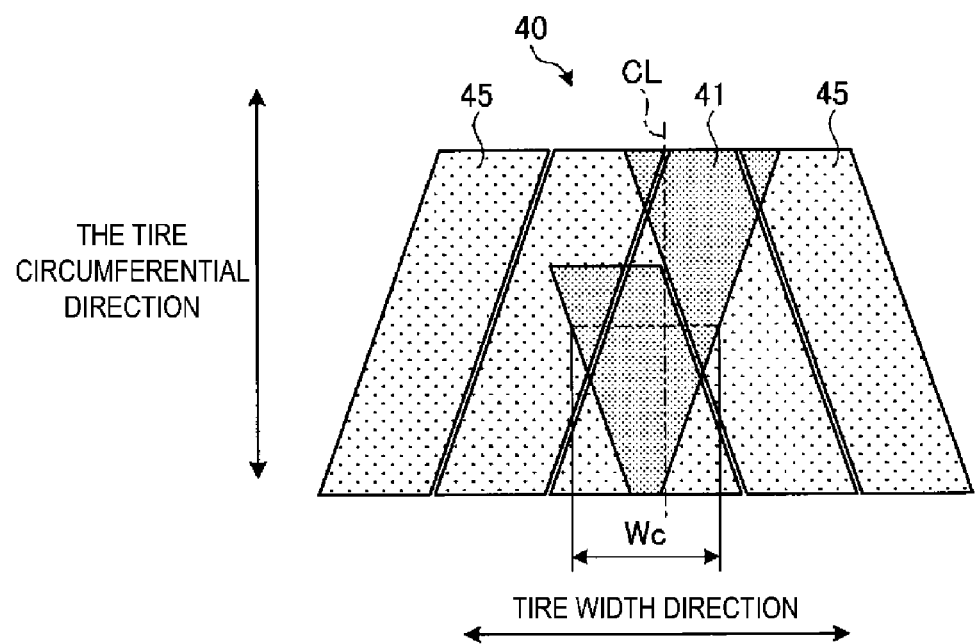
FIG. 4 is a schematic view of a belt reinforcing layer in the direction of an arrow C-C in FIG. 3.

FIG. 3 is a detailed view at or near the center block 21 of the tread portion 2 illustrated in FIG. 2. FIG. 4 is a schematic view of the belt reinforcing layer 40 in the direction of an arrow C-C in FIG. 3. The belt reinforcing layer 40 disposed on the outer side in the tire radial direction of the belt layer 14 is provided with a band-like member 45 wound in the tire circumferential direction, which is a member formed in a band shape with a width of approximately 10 mm, for example. The band-like member 45 is a reinforcing layer constituent member constituting the belt reinforcing layer 40, and the cord constituting the belt reinforcing layer 40 is formed by being coated with coating rubber. In other words, the belt reinforcing layer 40 is disposed by the band-like member 45, which is a reinforcing layer constituent member, being wound in a spiral shape on the outer side in the tire radial direction of the belt layer 14. At that time, the band-like member 45 is wound in one layer, at a position on an inner side in the tire radial direction of the second block 22 and the shoulder block 23, while two layers of the band-like member 45 are wound and overlap in the tire radial direction, at a position on an inner side in the tire radial direction of the center block 21. In other words, at the position on the inner side in the tire radial direction of the second block 22 and the shoulder block 23, the band-like member 45 is wound in a spiral shape without overlapping in the tire radial direction. On the other hand, at the position on the inner side in the tire radial direction of the center block 21, the band-like members 45 are wound and overlap each other in the tire radial direction when being wound in a spiral shape. In other words, the belt reinforcing layer 40 includes a center reinforcing portion 41 that is a portion, in the tread portion 2, in which more band-like members 45 are stacked at a position of a center region Ac, which will be described later, than at positions other than the center region Ac.

The center region Ac of the tread portion 2 will be described. The center region Ac is a region in the tire width direction in which the center block 21 is located, which is the block 20 closest to the tire equatorial plane CL among the plurality of blocks 20. Specifically, in a meridian cross-section view of the run-flat tire 1, the center region Ac is a region located between two center region boundary lines Lc located on both sides in the tire width direction of the center block 21, when the center region boundary line Lc is a line extending vertically, with respect to the tire inner surface 18, from an intersection point 24, the intersection point 24 being between a groove wall 35, located close to the center block 21 among the groove walls 35 of the center main groove 31 that defines the center block 21, and the ground contact surface 3, indicating an outer contour line on an outer side in the tire radial direction of the center block 21.

When the center main groove 31 oscillates in the tire width direction by being bent or curved in the tire width direction while extending in the tire circumferential direction, the center region Ac is defined by the widest range in the tire width direction. In other words, when the center main groove 31 oscillates in the tire width direction, the center region boundary line Lc defining the center region Ac is a line extended vertically, with respect to the tire inner surface 18, from the intersection point 24, the intersection point 24 being between the ground contact surface 3 and a portion, located on the outermost side in the tire width direction along the tire circumferential direction, of the groove wall 35 of the center main groove 31 defining the center block 21. The center region Ac defined in this manner is defined by a shape in a state in which the run-flat tire 1 is mounted on a regular rim and is inflated to the regular internal pressure.

The belt reinforcing layer 40 having the center reinforcing portion 41 at the position of the center region Ac is formed in such a way that the center reinforcing portion 41 protrudes to the inner side in the tire radial direction. That is, when more band-like member 45 are stacked at the position of the center region Ac than at positions other than the center region Ac, the increased number of the band-like members 45 at the position of the center region Ac are stacked on the inner side in the tire radial direction, with respect to the other band-like members 45.

In the present embodiment, a pair of band-like members 45 are used as the belt reinforcing layer 40, one band-like member 45 is disposed on one side in the tire width direction from a region of the tire equatorial plane CL, and the other band-like member 45 is disposed on the other side in the tire width direction from a region of the tire equatorial plane CL. Each pair of the band-like members 45 is disposed across the tire equatorial plane CL and is disposed in a spiral shape about the tire rotation axis, from a region of the tire equatorial plane CL to different end portions in the tire width direction. In other words, one band-like member 45 is wound in a spiral shape on the outer side in the tire radial direction of the belt layer 14, from a region of the tire equatorial plane CL to one end portion 46 (see FIG. 2) of the belt reinforcing layer 40, and the other band-like member 45 is wound in a spiral shape on the outer side in the tire radial direction of the belt layer 14, from a region of the tire equatorial plane CL to the other end portion 46 of the belt reinforcing layer 40.

The directions of the spirals of the pair of band-like members 45 are opposite to each other, that is, inclination directions in the tire width direction of the pair of band-like members 45 wound in a spiral shape are opposite to each other when the members are oriented in the same direction in the tire circumferential direction. Furthermore, in a portion of the belt reinforcing layer 40 where the band-like members 45 overlap each other at or near the tire equatorial plane CL, one band-like member 45 overlaps on the inner side in the tire radial direction of the other band-like member 45 so that the pair of band-like members 45 are stacked at or near the tire equatorial plane CL. The portion of the belt reinforcing layer 40 where the band-like members 45 are stacked in this manner is the center reinforcing portion 41, and the center reinforcing portion 41 is located in the center region Ac.

Here, since the pair of band-like members 45 are wound in a spiral shape in such a way that the inclination directions in the tire width direction are opposite to each other when they are oriented in the same direction in the tire circumferential direction, the overlapping portions of the band-like members 45 have different widths in the tire width direction depending on the position in the tire circumferential direction. Therefore, the width in the tire width direction of the center reinforcing portion 41 is also different depending on the position in the tire circumferential direction. In the belt reinforcing layer 40, a width Wc in the tire width direction of the center reinforcing portion 41 having a different width in the tire width direction depending on the position in the tire circumferential direction is, at any position in the tire circumferential direction, within a range of $0.5\ Gr \leq Wc \leq 2.5\ Gr$, with respect to a thickness Gr (see FIG. 2) of the side reinforcing rubber 50 at a tire maximum width position P of the run-flat tire 1. The relationship between the width Wc of the center reinforcing portion 41 in the tire width direction and the thickness Gr of the side reinforcing rubber 50 at the tire maximum width position P of the run-flat tire 1 is preferably within a range of $0.7\ Gr \leq Wc \leq 2.0\ Gr$.

In this case, the tire maximum width position P is a position in the tire radial direction at a position where the dimension in the tire width direction excluding a structure protruding from the surface of the sidewall portion 8 is maximized, in a no-load state in which the run-flat tire 1 is mounted on a regular rim and is inflated to the regular internal pressure and in which no load is applied to the run-flat tire 1. The thickness Gr of the side reinforcing rubber 50 at the tire maximum width position P of the run-flat tire 1 is the thickness of the side reinforcing rubber 50 at a position in the tire radial direction at the tire maximum width position P defined in this manner.

An average width of the width Wc of the center reinforcing portion 41 of the belt reinforcing layer 40 is within a range from 50% or greater to 90% or smaller of the width WL in the tire width direction of the center block 21. In other words, although the width Wc of the center reinforcing portion 41 in the tire width direction is different depending on the position in the tire circumferential direction, the average width of the width Wc of the center reinforcing portion 41 in the tire width direction over the entire circumference of the belt reinforcing layer 40 is 50% or greater and 90% or smaller of the width WL in the tire width direction of the center block 21. Since it is sufficient that the center reinforcing portion 41 has an average width that is 50% or greater and 90% or smaller of the width WL of the center block 21, for example, the width Wc of a part of the center reinforcing portion 41 on the tire circumference may be smaller than 50% and greater than 90% of the width WL in the tire width direction of the center block 21.

Figure 5:
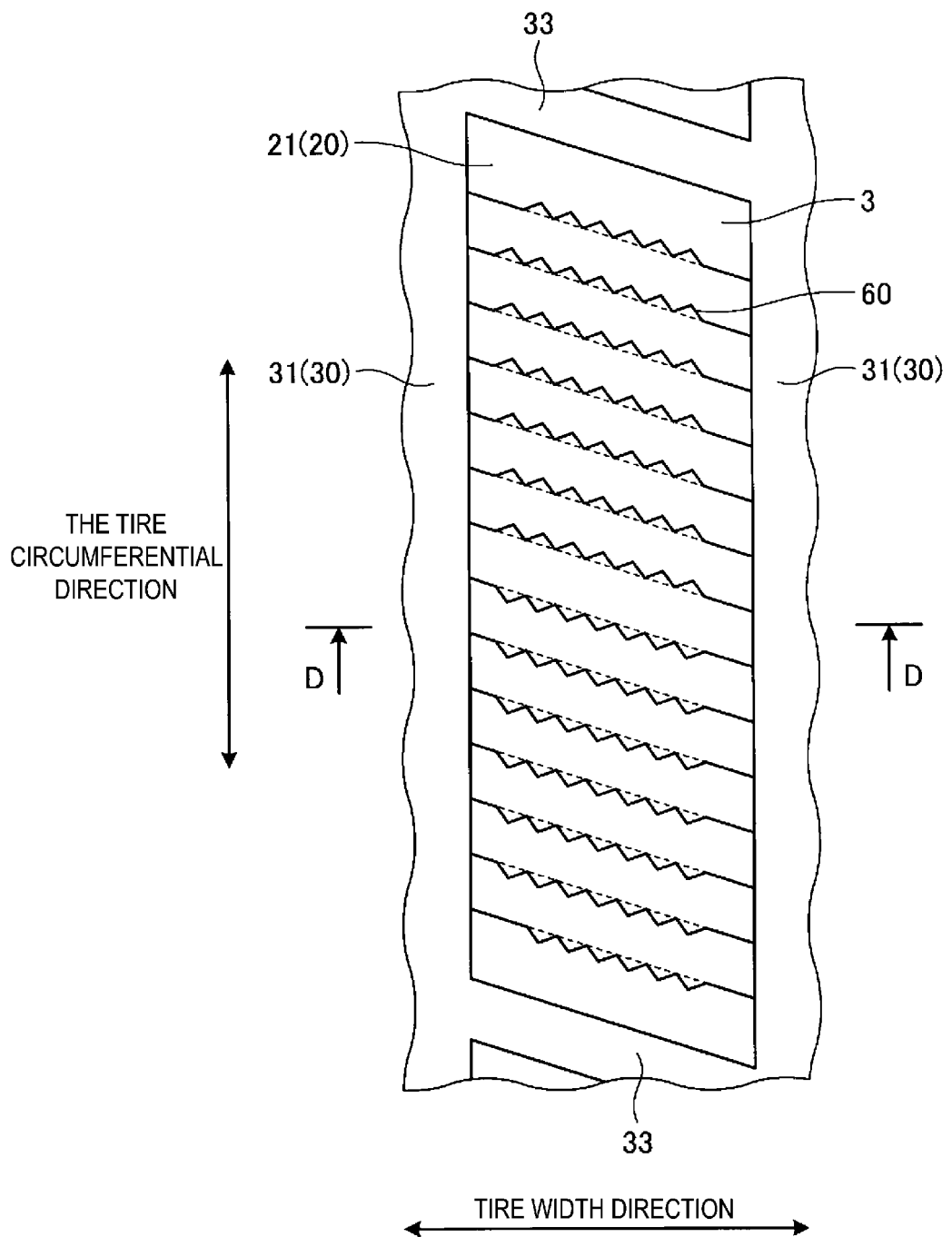
FIG. 5 is a plan view of the center block in the direction of the arrow C-C in FIG. 3.

FIG. 5 is a plan view of the center block 21 in the direction of the arrow C-C in FIG. 3. The plurality of blocks 20 formed in the tread portion 2 are defined by the main grooves 30 and the lug grooves 33, and a plurality of sipes 60 extending in the tire width direction is formed in each block 20. The plurality of sipes 60 formed in each of the blocks 20 are formed side by side in the tire circumferential direction while extending in the tire width direction. Among the sipes 60 formed in the blocks 20, the density of the sipes 60 formed in the center block 21 is larger than the density in the tire circumferential direction of the sipes 60 formed in the shoulder blocks 23 (see FIGS. 1 and 2). Moreover, the density in the tire circumferential direction of the sipes 60 formed in the center block 21 is within a range from 0.10 cords/mm (i.e., sipes/mm) or greater to 0.30 cords/mm (i.e., sipes/mm) or smaller.

Note that the sipes 60 described herein are formed in a narrow groove shape in the ground contact surface 3 and refer to such narrow grooves that wall surfaces constituting the narrow groove or at least parts of portions formed on the wall surface contact each other due to deformation of the block 20, when the run-flat tire 1 is mounted on a regular rim and is inflated to a regular internal pressure, although wall surfaces constituting the narrow groove do not contact each other in a no-load state, if the narrow groove is located in a ground contact region of the ground contact surface 3 formed on a flat plate when a load is applied to the flat plate in a vertical direction or if the block 20 where the narrow groove is formed collapses. In the present embodiment, the width of the sipe 60 is within a range from 5.0 mm or greater to 25.0 mm or smaller, and a depth thereof is within a range from 5.5 mm or greater to 8.5 mm or smaller. Moreover, the density in the tire circumferential direction of the sipes 60 formed in the center block 21 is preferably within a range from 0.17 cords/mm or greater to 0.25 cords/mm or smaller.

The sipes 60 formed in each of the blocks 20 may be open sipes in which end portions in the tire width direction are open to the main grooves 30 or may be closed sipes in which end portions in the tire width direction terminate within the blocks 20. The sipes 60 formed in each of the blocks 20 may be two-dimensional sipes or three-dimensional sipes.

The two-dimensional sipes described herein are the sipes 60 in a two-dimensional shape that extend in a straight shape without being bent when extending in the tire width direction or facing toward a tire depth direction. That is, the two-dimensional sipes are the sipes 60 having sipe wall surfaces in a straight shape in any cross-sectional view in which a sipe length direction is a normal line (a cross-sectional view including a sipe width direction and a sipe depth direction). The three-dimensional sipes are the sipes 60 in a three-dimensional shape that oscillate in the sipe width direction with respect to both the sipe length direction and the sipe depth direction. That is, the three-dimensional sipes are the sipes 60 having sipe wall surfaces in a bent shape with oscillation in the sipe width direction in both cross-sectional view in which the sipe length direction is a normal line direction and cross-sectional view in which the sipe depth direction is a normal line direction. In the present embodiment, the sipes 60 formed in the center block 21 are two-dimensional open sipes.

Figure 6:
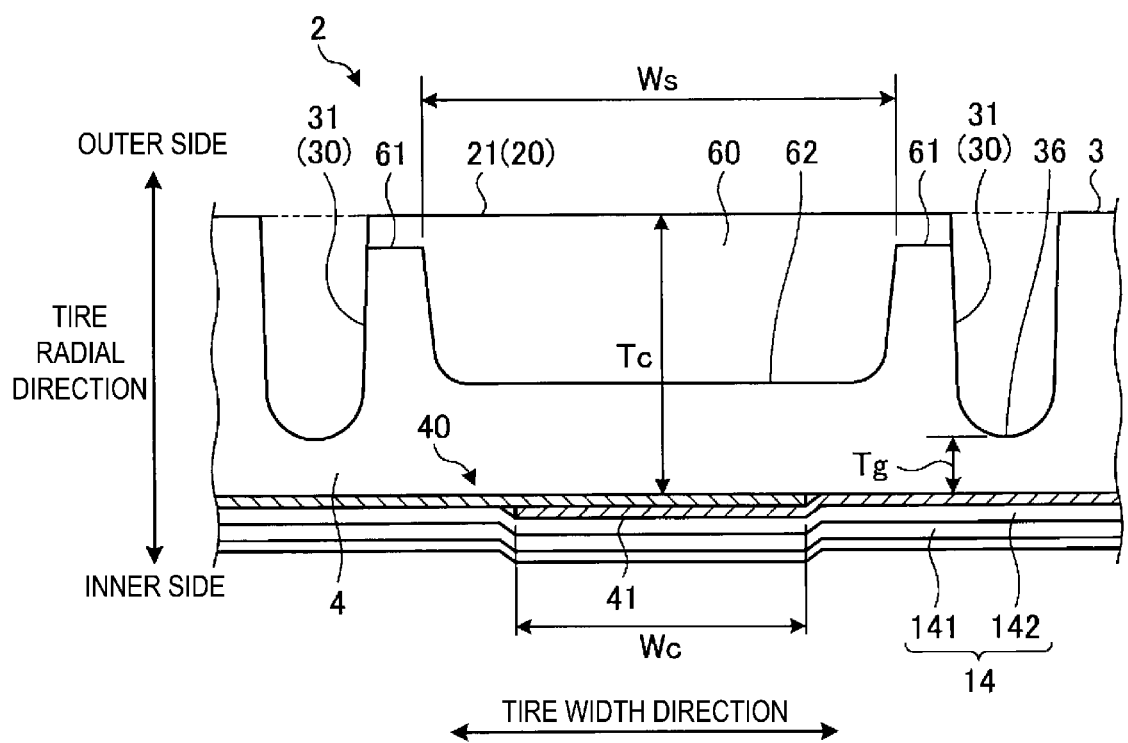
FIG. 6 is a cross-sectional view taken along a line D-D in FIG. 5.

FIG. 6 is a cross-sectional view taken along a line D-D of FIG. 5. Among the sipes 60 formed in each of the blocks 20, at least the sipes 60 formed in the center block 21 have a raised bottom portion 61 that is a portion formed with a shallow sipe depth. In the present embodiment, the sipes 60 formed in the center block 21 have the raised bottom portions 61 formed at or near both ends in the tire width direction, that is, at or near portions of the sipes 60 that are open to the main grooves 30, and portions of the raised bottom portions 61 are formed as deep bottom portions 62 in which the raised bottom portions 61 are not formed. The deep bottom portion 62 has a deeper sipe depth than the raised bottom portion 61.

A position of at least a part in the tire width direction of the center reinforcing portion 41 of the belt reinforcing layer 40 is at the same position as a position of at least a part of the deep bottom portion 62 of the sipe 60 formed in the center block 21. Due to this, the center reinforcing portion 41 is disposed to overlap the deepest sipe depth position of the sipes 60 formed in the center block 21 in the tire radial direction. Moreover, the center reinforcing portion 41 is formed such that an average width of the width We in the tire width direction is 50% or greater of a width Ws in the tire width direction of the deep bottom portion 62 of the sipe 60. Note that the center reinforcing portion 41 is preferably formed such that the average width of the width We in the tire width direction is 60% or greater of the width Ws in the tire width direction of the deep bottom portion 62 of the sipe 60.

In the tread portion 2, a relationship between a minimum thickness Tg of the rubber thickness between the belt reinforcing layer 40 and a groove bottom 36 of the center main groove 31 defining the center block 21 and an average thickness Tc of the tread rubber layer 4, in the center block 21, on the outer side in the tire radial direction of the belt reinforcing layer 40 is within a range of $0.12 \leq (Tg/Tc) \leq 0.4$. Note that the relationship between the minimum thickness Tg of the rubber thickness between the belt layer 14 and the groove bottom 36 of the center main groove 31 and the average thickness Tc of the tread rubber layer 4, in the center block 21, on the outer side in the tire radial direction of the belt reinforcing layer 40 is preferably within a range of $0.15 \leq (Tg/Tc) \leq 0.25$.

Note that the average thickness Tc of the tread rubber layer 4, in the center block 21, on the outer side in the tire radial direction of the belt reinforcing layer 40 is the average thickness when a distance between the ground contact surface 3 and the belt reinforcing layer 40 at the position of the center block 21 is the thickness of the tread rubber layer 4. In other words, the average thickness Tc of the tread rubber layer 4, in the center block 21, on the outer side in the tire radial direction of the belt reinforcing layer 40 is an average value of the distance from the ground contact surface 3, in the center block 21, to the belt reinforcing layer 40.

Figure 7:
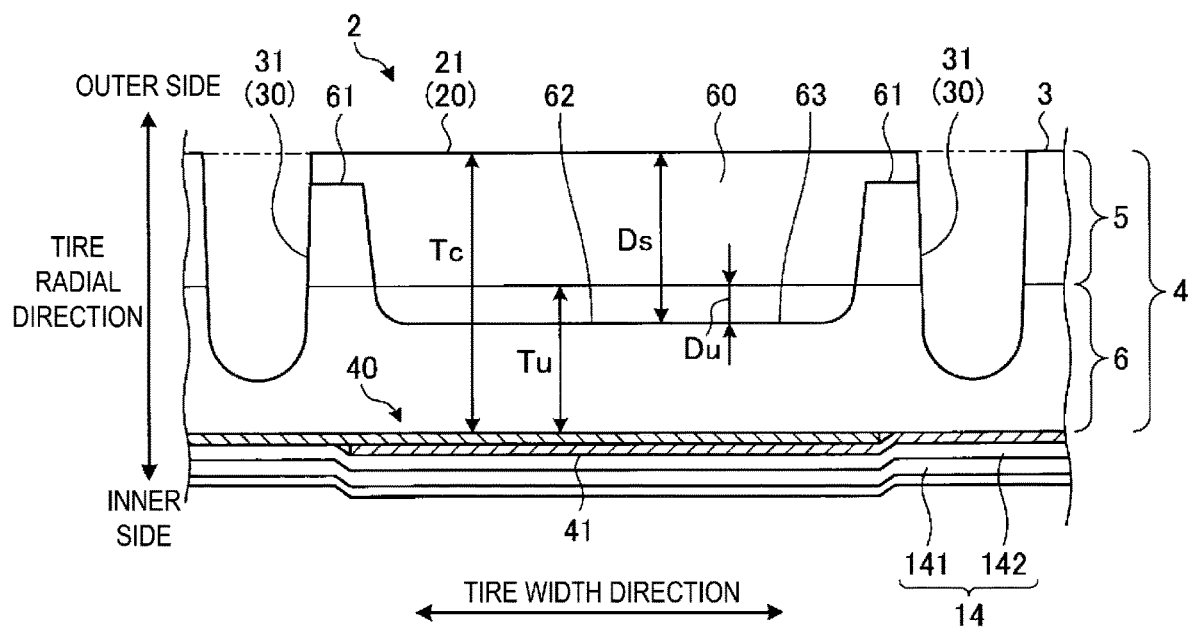
FIG. 7 is a cross-sectional view taken along the line D-D in FIG. 5 and is an explanatory diagram of a tread rubber layer.

FIG. 7 is a cross-sectional view taken along the line D-D in FIG. 5 and is an explanatory diagram of the tread rubber layer 4. The tread rubber layer 4 of the tread portion 2 includes: a cap tread 5 that is exposed on the outermost side in the tire radial direction of the run-flat tire 1 and that forms the ground contact surface 3; and an undertread 6 disposed on the inner side in the tire radial direction of the cap tread 5. The cap tread 5 and the undertread 6 of the tread rubber layer 4 are formed from rubber compositions having different physical properties.

Specifically, a modulus at 300% elongation of the cap tread 5 is within a range from 4.0 MPa or greater to 10.0 MPa or smaller. A modulus at 300% elongation of the undertread 6 is within a range from 10.0 MPa or greater to 15.0 MPa or smaller. The modulus at 300% elongation is measured in a tensile test at 23° C. in accordance with JIS (Japanese Industrial Standard) K6251 (using dumbbell No. 3) and indicates tensile stress at 300% elongation.

As described above, in the tread rubber layer 4 having the cap tread 5 and the undertread 6, a thickness Tu in the tire radial direction of the undertread 6 at the position of the center block 21 is within a range from 50% or greater to 80% or smaller of the thickness Tc of the tread rubber layer 4 in the tire radial direction at the position of the center block 21. Note that in this case, the thickness Tu of the undertread 6 and the thickness Tc of the tread rubber layer 4 are compared by the average thicknesses within the center block 21.

The sipe depth of the sipes 60 formed in the center block 21 is larger than the thickness of the cap tread 5. Therefore, the sipes 60 formed in the center block 21 penetrate into the cap tread 5 and enter into the undertread 6, and a sipe bottom 63 of the deep bottom portion 62 is located in the undertread 6. In the sipes 60 formed in this manner, a relationship between a sipe depth Ds and a depth Du of a portion of the sipe 60 that has penetrated into the undertread 6 is within a range of $0.05 \leq (Du/Ds) \leq 0.55$. The depth Du of the portion of the sipe 60 that has penetrated into the undertread 6 is a distance in the tire radial direction between the sipe bottom 63 of the deep bottom portion 62 of the sipe 60 and the boundary face between the undertread 6 and the cap tread 5.

When the run-flat tire 1 according to an embodiment of the present embodiment is mounted on a vehicle, the run-flat tire 1 is mounted on a rim wheel R by fitting the rim wheel R (see FIG. 8) to the bead portion 10 and is mounted on the vehicle in a state of being inflated by the air filled therein. When a vehicle having the run-flat tire 1 mounted thereon travels, the run-flat tire 1 rotates while a portion of the ground contact surface 3 located downward of the ground contact surface 3 contacts the road surface. When a vehicle having the run-flat tire 1 mounted thereon travels on dry road surfaces, the vehicle travels by transmitting driving force and braking force to the road surface and by generating turning force with the aid of mainly the frictional force between the ground contact surface 3 and the road surface. When a vehicle travels on wet road surfaces, the vehicle travels in such a way that the water between the ground contact surface 3 and the road surface enters the main grooves 30, the lug grooves 33, and the like, and the water between the ground contact surface 3 and the road surface is drained through these grooves. As a result, the ground contact surface 3 is easily grounded on the road surface, and the vehicle can travel with the frictional force between the ground contact surface 3 and the road surface.

When a vehicle travels on icy road surfaces, the vehicle travels using the edge effect of the main grooves 30, the lug grooves 33, and the sipes 60. In other words, when a vehicle travels on icy road surfaces, the vehicle travels using the resistance caused by the edges of the main grooves 30, the edges of the lug grooves 33, and the edges of the sipes 60 being caught on the ice surface. When a vehicle travels on icy road surfaces, water on a surface of the icy road surface is picked up by the sipe 60 to remove the water film between the icy road surface and the ground contact surface 3, to facilitate contact between the icy road surface and the ground contact surface 3. As a result, the resistance between the ground contact surface 3 and the icy road surface is increased due to frictional force and the edge effect, and it is possible to ensure running performance on icy road surfaces of a vehicle having the run-flat tire 1 mounted thereon.

When the vehicle having the run-flat tire 1 mounted thereon travels, although the vehicle can travel with the aid of the frictional force generated between the road surface and the ground contact surface 3 of the run-flat tire 1 as described above, loads in various directions act on each part of the run-flat tire 1 during traveling of a vehicle. The load acting on the run-flat tire 1 is received by the pressure of the air filled inside the run-flat tire 1, the carcass layer 13 provided as the framework of the run-flat tire 1, and the like. For example, due to the weight of the vehicle and the recesses and protrusion of the road surface, the load acting in the tire radial direction between the tread portion 2 and the bead portion 10 is mainly received by the pressure of the air filled inside the run-flat tire 1 or deflection of the sidewall portion 8 or the like. In other words, the air filled inside the run-flat tire 1 acts as a force that expands the run-flat tire 1 outward from the inside. During traveling of a vehicle, the run-flat tire 1 receives a large load thanks to the biasing force to the outward direction from the inside by the air filled therein and travels while the sidewall portion 8 or the like is appropriately deflected, whereby the vehicle can travel while ensuring riding comfort.

Here, the air inside the run-flat tire 1 may escape, for example, due to a puncture when a foreign material sticks into the ground contact surface 3. When the air inside escapes, since the air pressure decreases and the biasing force due to the air from the inside of the run-flat tire 1 to the outward direction decreases, it is difficult for the internal air pressure to receive the load during traveling of the vehicle. In this case, in the run-flat tire 1 according to an embodiment of the present embodiment, a part of the load that is difficult to be received by the air pressure can be received by the side reinforcing rubber 50 provided in the sidewall portion 8. In other words, since the side reinforcing rubber 50 is formed from a rubber material having higher strength than the rubber forming the sidewall portion 8, the side reinforcing rubber 50 can suppress deformation of the sidewall portion 8 in the tire radial direction even when a large load in the tire radial direction acts on the sidewall portion 8.

On the other hand, in the run-flat tire 1, since the side reinforcing rubber 50 is disposed in the sidewall portion 8, the deflection of the sidewall portion 8 when a load in the tire radial direction acts on the sidewall portion 8 is reduced as compared to a typical pneumatic tire in which the side reinforcing rubber 50 is not disposed in the sidewall portion 8. Therefore, when the tread portion 2 treads on a projection protruding from road surfaces such as a stone present on the road surfaces during traveling of a vehicle, the run-flat tire 1 may not be able to absorb changes in the shape of the road surface due to the presence of the projection, and the projection may penetrate through the tread portion 2 of the run-flat tire 1. That is, in the run-flat tire 1 in which the rigidity of the sidewall portion 8 is high and the deflection of the sidewall portion 8 with respect to the load in the tire radial direction is small, when the projection on the road surface is treaded, the projection may penetrate through the tread portion 2 due to the small deflection of the sidewall portion 8, and shock bursts may occur.

Figure 8:
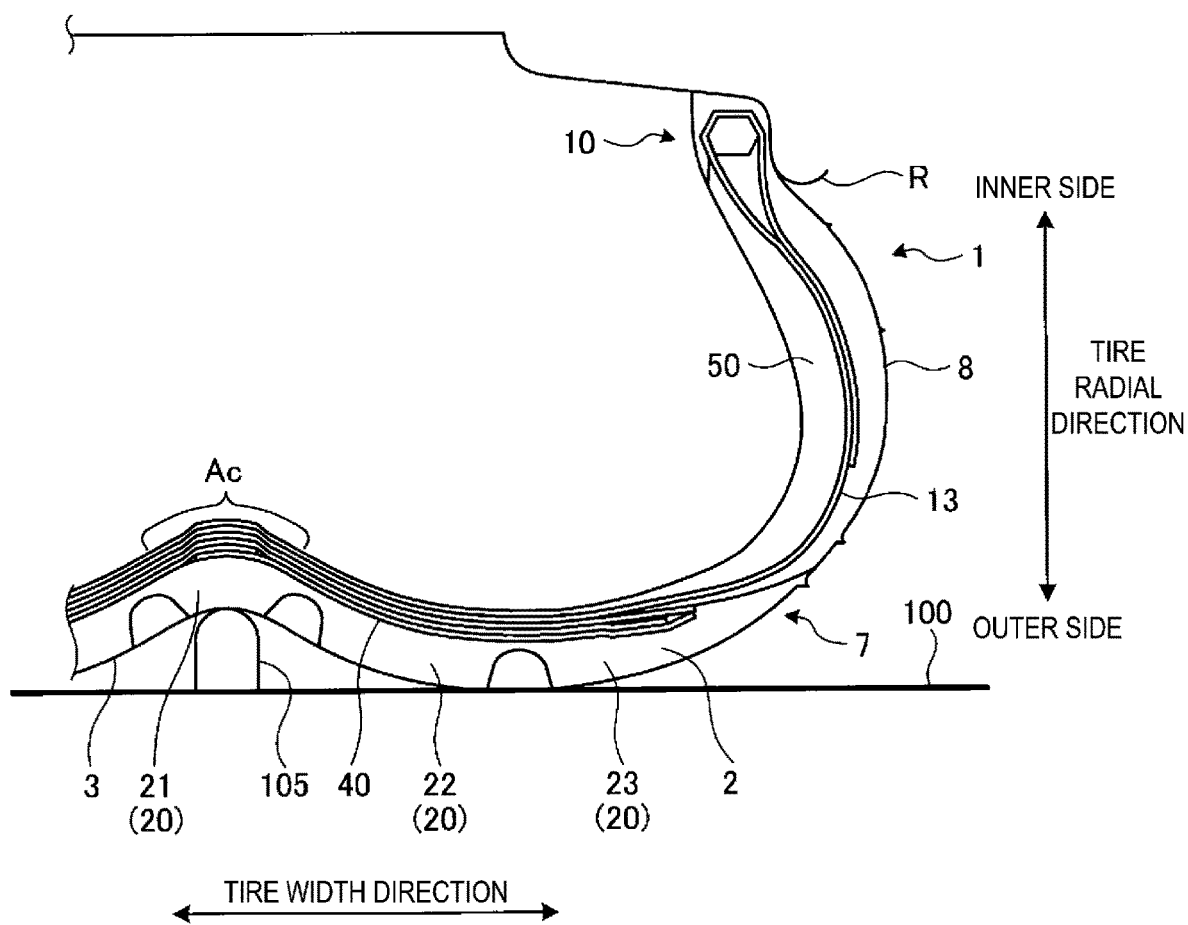
FIG. 8 is an explanatory diagram illustrating a state in which a run-flat tire according to an embodiment treads on a projection on a road surface.

In contrast, in the run-flat tire 1 according to an embodiment of the present embodiment, since the center reinforcing portion 41 is provided in the belt reinforcing layer 40 disposed on the outer side in the tire radial direction of the belt layer 14, it is possible to suppress shock bursts when the rigidity of the sidewall portions 8 is high due to the side reinforcing rubber 50 disposed in the sidewall portion 8. FIG. 8 is an explanatory diagram illustrating a state in which a projection 105 on a road surface 100 is treaded on the run-flat tire 1 according to an embodiment. In the run-flat tire 1 according to an embodiment of the present embodiment, since strength at break at or near the center in the tire width direction of the tread portion 2 can be increased by providing the center reinforcing portion 41 in the belt reinforcing layer 40, even when the projection 105 on the road surface 100 is treaded at or near the center region Ac, the projection 105 can be prevented from penetrating through the tread portion 2. Moreover, in the belt reinforcing layer 40, by making the numbers of band-like members 45 at the positions other than the center region Ac less than the number of band-like members 45 that constitute the center reinforcing portion 41, a region other than the center region Ac can be deformed preferentially when the projection 105 is treaded at or near the center region Ac of the tread portion 2. For example, when the projection 105 is treaded at or near the center region Ac of the tread portion 2, the region at or near the shoulder portion 7 of the tread portion 2 can be deformed preferentially, and the region at or near the shoulder portion 7 can be easily deformed in a direction in which a region of the center region Ac is separated from the road surface 100. In this way, it is possible to reduce the pressure applied from the projection 105 to the tread portion 2 and possible to suppress the projection 105 from penetrating through the tread portion 2. Therefore, shock bursts caused by the projection 105 being treaded during traveling of the vehicle can be suppressed.

In the belt reinforcing layer 40, since the width Wc of the center reinforcing portion 41 in the tire width direction is within a range of $0.5\ Gr \le Wc \le 2.5\ Gr$ with respect to the thickness Gr of the side reinforcing rubber 50 at the tire maximum width position P, it is possible to improve the shock burst resistance performance while ensuring the performance on ice and run-flat travel performance. In other words, when the relationship between the width Wc of the center reinforcing portion 41 and the thickness Gr of the side reinforcing rubber 50 is $Wc < 0.5\ Gr$, the width Wc of the center reinforcing portion 41 may become too narrow, and the thickness Gr of the side reinforcing rubber 50 may become too thick. When the width Wc of the center reinforcing portion 41 is too narrow, since it is difficult to increase the strength at break at or near the center of the tread portion 2 in the tire width direction, shock bursts are not easily suppressed. Moreover, when the thickness Gr of the side reinforcing rubber 50 is too thick, since the rigidity of the sidewall portion 8 becomes too high and the sidewall portion 8 is not easily deflected, the proportion of the force absorbed by the tread portion 2, received from the projection 105 when the projection 105 is treaded by the tread portion 2 is increased, and shock bursts are not easily suppressed.

When the relationship between the width Wc of the center reinforcing portion 41 and the thickness Gr of the side reinforcing rubber 50 is $Wc > 2.5\ Gr$, the width Wc of the center reinforcing portion 41 may become too wide, and the thickness Gr of the side reinforcing rubber 50 may become too thin. When the width Wc of the center reinforcing portion 41 is too wide, a ground contact length of the region where the second block 22 is located when the ground contact surface 3 ground-contacts the road surface 100 may decrease, and it may be difficult to ensure running performance on icy road surfaces. In other words, since the rigidity of the center reinforcing portion 41 is higher than that of the region in the belt reinforcing layer 40 other than the center reinforcing portion 41, the rigidity of the region in the tread portion 2 where the center reinforcing portion 41 is disposed is higher than the rigidity of the region other than the region where the center reinforcing portion 41 is disposed. Due to this, when the ground contact surface 3 is in contact with the ground, since the deflection of the tread portion 2 during ground-contacting in the center region Ac, which is the region in the tread portion 2 where the center reinforcing portion 41 is disposed, becomes relatively small, it is difficult to increase the ground contact length. Therefore, when the width Wc of the center reinforcing portion 41 is too wide and the region where the center reinforcing portion 41 is disposed approaches the region where the second block 22 is located, since the ground contact length of the region where the second block 22 is located as well as the center region Ac is not easily increased, the ground contact area of the second block 22 is likely to decrease. Therefore, when traveling on icy road surfaces, since the edge effect of the second block 22 decreases and the water pickup effect of the sipes 60 formed in the second block 22 decreases, it may be difficult to ensure the running performance when traveling on icy road surfaces. Moreover, when the thickness Gr of the side reinforcing rubber 50 is too thin, since the effect of the side reinforcing rubber 50 reinforcing the sidewall portion 8 decreases, the sidewall portion 8 may be easily deflected greatly during run-flat travel and run-flat travel performance may decrease.

In contrast, when the relationship between the width Wc of the center reinforcing portion 41 and the thickness Gr of the side reinforcing rubber 50 is within a range of $0.5\,Gr \le Wc \le 2.5\,Gr$, it is possible to increase the strength at break of the tread portion 2 with the aid of the center reinforcing portion 41 while suppressing decrease in the ground contact length of the region where the second block 22 is located due to the width Wc of the center reinforcing portion 41 being too wide. Moreover, it is possible to ensure the rigidity of the sidewall portion 8 required for run-flat travel with the aid of the side reinforcing rubber 50 while allowing the sidewall portion 8 to be bent to a certain extent when the projection 105 is treaded by the tread portion 2. As a result, it is possible to improve the shock burst resistance performance while ensuring running performance on icy road surfaces and run-flat travel performance.

Although the sipes 60 formed in the tread portion 2 contribute to running performance on icy road surfaces, the density in the tire circumferential direction of the sipes 60 formed in the center block 21 is larger than the density in the tire circumferential direction of the sipes 60 formed in the shoulder blocks 23. Due to this, since the edge effect at the center block 21 where a large load is applied and where the ground contact length is likely to increase can be enhanced and since the water pickup effect of the sipes 60 can be enhanced during regular traveling, it is possible to ensure the running performance on icy road surfaces more reliably.

Since the density in the tire circumferential direction of the sipes 60 formed in the center block 21 is within a range from 0.10 (cords/mm) or greater to 0.30 (cords/mm) or smaller, it is possible to improve the shock burst resistance performance while ensuring the running performance on icy road surfaces. In other words, when the density in the tire circumferential direction of the sipes 60 formed in the center block 21 is smaller than 0.10 cords/mm, since the density of the sipes 60 formed in the center block 21 is too small, it may be difficult to enhance the edge effect at the center block 21 and difficult to enhance the water pickup effect of the sipes 60 formed in the center block 21. When the density in the tire circumferential direction of the sipes 60 formed in the center block 21 is larger than 0.30 cords/mm, since the density of the sipes 60 formed in the center block 21 is too large, the rigidity of the center block 21 may become too low. In this case, since it is difficult to increase the strength at break at or near the center of the tread portion 2 in the tire width direction, it is difficult to suppress shock bursts.

In contrast, when the density in the tire circumferential direction of the sipes 60 formed in the center block 21 is within a range from 0.10 (mm/mm) or greater to 0.30 (cords/mm) or smaller, it is possible to enhance the edge effect at the center block 21 and the water pickup effect of the sipes 60 formed in the center block 21 while suppressing the rigidity of the center block 21 from becoming too low. Due to this, it is possible to improve the shock burst resistance performance while ensuring the running performance on icy road surfaces.

Since the width WL in the tire width direction of the center block 21 is within a range from 7% or greater to 20% or smaller of the development width TW of the tread portion 2, it is possible to ensure the shock burst resistance performance while ensuring the running performance on icy road surfaces. In other words, when the width WL of the center block 21 is smaller than 7% of the development width TW of the tread portion 2, since the width WL of the center block 21 is too narrow, the rigidity of the center block 21 may become too low. In this case, since it is difficult to increase the strength at break at or near the center of the tread portion 2 in the tire width direction, it is difficult to suppress shock bursts. When the width WL of the center block 21 is larger than 20% of the development width TW of the tread portion 2, since the width WL of the center block 21 is too wide, the interval between two center main grooves 31 defining the center block 21 may become too large. In this case, the edge effect of the region around the center region Ac may decrease, and it may be difficult to ensure the running performance on icy road surfaces.

In contrast, when the width WL in the tire width direction of the center block 21 is within a range from 7% or greater to 20% or smaller of the development width TW of the tread portion 2, it is possible to ensure the shock burst resistance performance while suppressing the interval between the center main grooves 31 from becoming too large and while ensuring the edge effect of the region around the center region Ac. As a result, it is possible to improve the shock burst resistance without degrading the performance on ice.

Since the center reinforcing portion 41 of the belt reinforcing layer 40 is formed so as to protrude to the inner side in the tire radial direction, it is possible to increase the thickness of the center reinforcing portion 41 without reducing the thickness of the tread rubber layer 4 at the same position in the tire width direction as the position of the center reinforcing portion 41. Due to this, it is possible to increase the strength at break of the tread portion 2 at or near the center in the tire width direction more reliably.

Since the center reinforcing portion 41 is formed so as to protrude to the inner side in the tire radial direction, the shape of the belt layer 14 disposed along the belt reinforcing layer 40 and the portion of the carcass layer 13 overlapping the center reinforcing portion 41 can be formed so as to protrude to the inner side in the tire radial direction. Due to this, it is possible to decrease tension in the portion of the carcass layer 13 overlapping the center reinforcing portion 41. In other words, when the run-flat tire 1 is filled with air during the use thereof, although tension acts on the entire run-flat tire 1 due to the internal pressure, this tension is mainly received by the carcass layer 13. In other words, since the carcass layer 13 spans between the pair of bead portions 10 and has a role as the framework of the run-flat tire 1, tension due to internal pressure is mainly received by the carcass layer 13. Therefore, during filling with internal pressure, large tension acts on the carcass layer 13.

On the other hand, since the portion of the carcass layer 13 overlapping the center reinforcing portion 41 has such a shape that protrudes to the inner side in the tire radial direction in a non-inflated state, when the run-flat tire 1 is in use, tension is applied to the carcass layer 13 filled with internal pressure, after tension is applied to portions other than the portion overlapping the center reinforcing portion 41. Therefore, the portion of the carcass layer 13 overlapping the center reinforcing portion 41 can suppress the tension applied by the internal pressure even after the internal pressure is filled, and the amount of deflection of the carcass layer 13 when the projection 105 is treaded by the tread portion 2 can be ensured. In this way, it is possible to ensure the amount of deflection of the tread portion 2 when the projection 105 is treaded by the tread portion 2 and possible to suppress shock bursts. As a result, it is possible to improve shock burst resistance performance more reliably.

Moreover, in the tread rubber layer 4, since the modulus at 300% elongation of the cap tread 5 is smaller than the modulus at 300% elongation of the undertread 6, it is possible to easily deform the ground contact surface 3 of the tread portion 2 so that the ground contact surface 3 conforms to the shape of the road surface when the vehicle is traveling. Due to this, even when traveling on icy road surfaces, the ground contact surface 3 can contact the road surface 100 more reliably, and running performance on icy road surfaces can be ensured.

Since the modulus of the tread rubber layer 4 at 300% elongation of the cap tread 5 is within a range from 4.0 MPa or greater to 10.0 MPa or smaller and since the modulus at 300% elongation of the undertread 6 is within a range from 10.0 MPa or greater to 15.0 MPa or smaller, it is possible to ensure the contact properties of the ground contact surface 3 with respect to the road surface 100 while suppressing the rigidity of the tread portion 2 from becoming too low. In other words, when the modulus at 300% elongation of the cap tread 5 is smaller than 4.0 MPa and the modulus at 300% elongation of the undertread 6 is smaller than 10.0 MPa, the overall rigidity of the tread portion 2 may become too low. In this case, since it is difficult to ensure the strength at break of the tread portion 2, it is difficult to suppress shock bursts. Moreover, when the modulus at 300% elongation of the cap tread 5 is larger than 10.0 MPa or the modulus at 300% elongation of the undertread 6 is larger than 15.0 MPa, the overall rigidity of the tread portion 2 may become too high. In this case, since each of the blocks 20 of the tread portion 2 is not easily deformed elastically, it is difficult for the ground contact surface 3 of the tread portion 2 to deform to conform to the shape of the road surface when traveling on icy road surfaces, and the contact properties with respect to the road surface 100 may decrease. Due to this, it may be difficult to ensure the running performance on icy road surfaces.

In contrast, when the modulus at 300% elongation of the cap tread 5 is within a range from 4.0 MPa or greater to 10.0 MPa or smaller and when the modulus at 300% elongation of the undertread 6 is within a range from 10.0 MPa or greater to 15.0 MPa or smaller, the contact properties of the ground contact surface 3 with respect to the road surface 100 can be ensured while suppressing the rigidity of the tread portion 2 from becoming too low. As a result, it is possible to improve the shock burst resistance more reliably without degrading the performance on ice.

Since the thickness Tu of the undertread 6 in the tire radial direction at the position of the center block 21 is within a range from 50% or greater to 80% or smaller of the thickness Tc of the tread rubber layer 4 in the tire radial direction at the position of the center block 21, it is possible to ensure the contact properties of the ground contact surface 3 with respect to the road surface 100 while suppressing the rigidity of the center block 21 from becoming too low. In other words, when the thickness Tu of the undertread 6 at the position of the center block 21 is smaller than 50% of the thickness Tc of the tread rubber layer 4, since the thickness Tu of the undertread 6 becomes too thin and the thickness of the cap tread 5 becomes too thick, the rigidity of the center block 21 may become too low. In this case, since it is difficult to increase the strength at break of the tread portion 2 at or near the center in the tire width direction, it may be difficult to suppress shock bursts. When the thickness Tu of the undertread 6 at the position of the center block 21 is larger than 80% of the thickness Tc of the tread rubber layer 4, since the thickness Tu of the undertread 6 becomes too thick and the thickness of the cap tread 5 becomes too thin, the rigidity of the center block 21 may become too high. In this case, since the center block 21 is not easily deformed elastically, the ground contact surface 3 of the center block 21 does not easily deform to conform to the shape of the road surface when traveling on icy road surfaces, and it is difficult to ensure running performance on icy road surfaces.

In contrast, when the thickness Tu of the undertread 6 at the position of the center block 21 is within a range from 50% or greater to 80% or smaller of the thickness Tc of the tread rubber layer 4, it is possible to ensure the contact properties of the ground contact surface 3 of the center block 21 with respect to the road surface 100 while suppressing the rigidity of the center block 21 from becoming too low. As a result, it is possible to improve the shock burst resistance more reliably without degrading the performance on ice.

Since the center reinforcing portion 41 of the belt reinforcing layer 40 is disposed so as to overlap the deepest depth position of the sipes 60 formed in the center block 21 in the tire radial direction, it is possible to ensure the rigidity of the center block 21 at the position where rigidity tends to decrease with the aid of the center reinforcing portion 41. Due to this, it is possible to increase the strength at break at the position of the center block 21 more reliably. As a result, it is possible to improve the shock burst resistance more reliably.

In the tread portion 2, since the relationship between the minimum thickness Tg of the rubber thickness between the belt reinforcing layer 40 and the groove bottom 36 of the center main groove 31 and the average thickness Tc of the tread rubber layer 4 in the center region Ac is within a range of $0.12 \leq (Tg/Tc) \leq 0.4$, it is possible to improve the shock burst resistance performance while suppressing degradation in rolling resistance. In other words, when the minimum thickness Tg of the rubber thickness between the belt reinforcing layer 40 and the groove bottom 36 of the center main groove 31 is $(Tg/Tc)<0.12$ with respect to the average thickness Tc of the tread rubber layer 4 in the center region Ac, since the minimum thickness Tg between the belt reinforcing layer 40 and the center main groove 31 is too thin when the tread portion 2 treads on the projection 105 and the tread portion 2 is bent, deformation at the position of the center main groove 31 may become too large. In this case, since the tread portion 2 is deformed locally, the tread portion 2 may be easily damaged, and it may be difficult to improve the shock burst resistance performance. When the minimum thickness Tg of the rubber thickness between the belt reinforcing layer 40 and the groove bottom 36 of the center main groove 31 is $(Tg/Tc)>0.4$ with respect to the average thickness Tc of the tread rubber layer 4 in the center region Ac, since the minimum thickness Tg of the rubber thickness between the belt reinforcing layer 40 and the center main groove 31 is too large, the energy loss during rolling of the run-flat tire 1 is likely to increase, and rolling resistance is likely to degrade.

In contrast, when the relationship between the minimum thickness Tg of the rubber thickness between the belt reinforcing layer 40 and the groove bottom 36 of the center main groove 31 and the average thickness Tc of the tread rubber layer 4 in the center region Ac is within a range of $0.12 \leq (Tg/Tc) \leq 0.4$, it is possible to suppress the tread portion 2 from being locally deformed in a great degree at the position of the center main groove 31 when the tread portion 2 treads on the projection 105 while reducing the energy loss during rolling of the run-flat tire 1. As a result, it is possible to improve the shock burst resistance performance more reliably and to further reduce the rolling resistance.

Modified Examples

Figure 9:
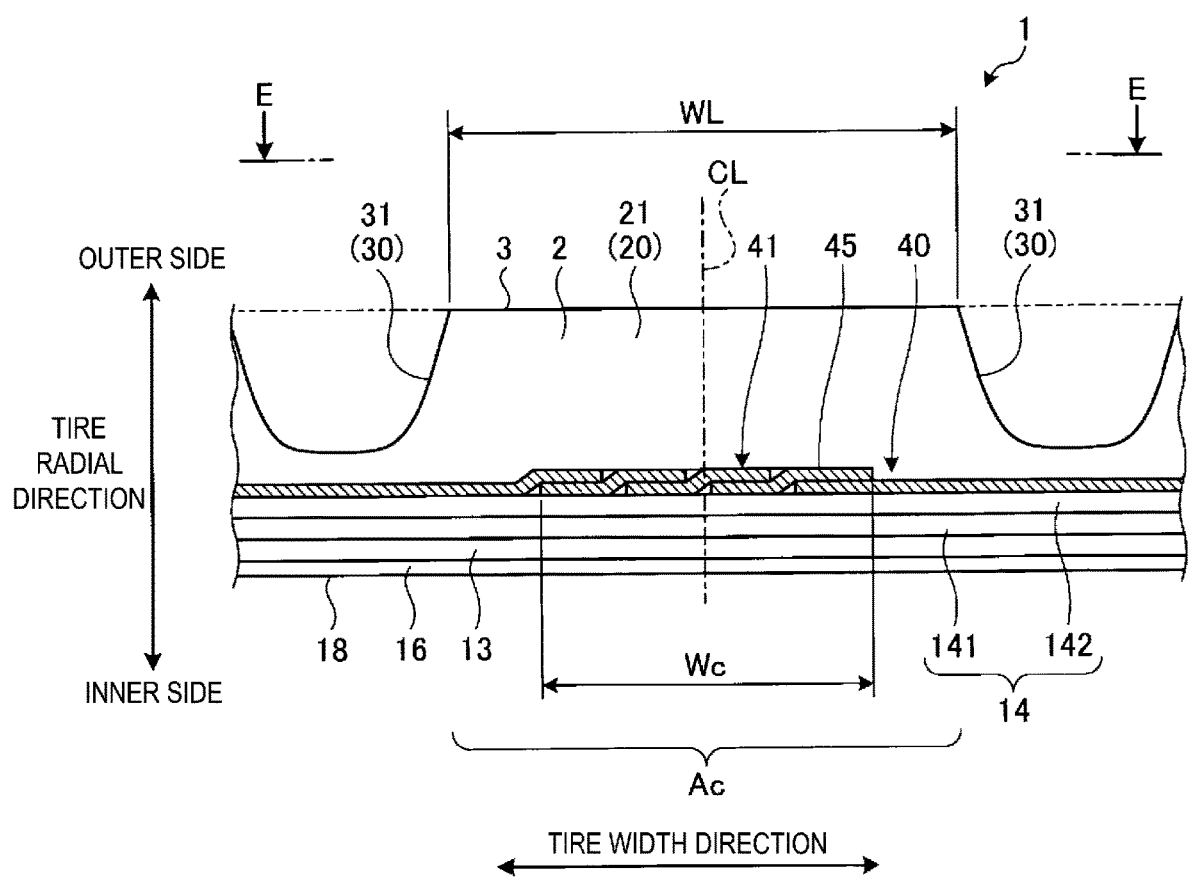
FIG. 9 is a modified example of the run-flat tire according to an embodiment and is a meridian cross-sectional view of a center region of a tread portion.
Figure 10:
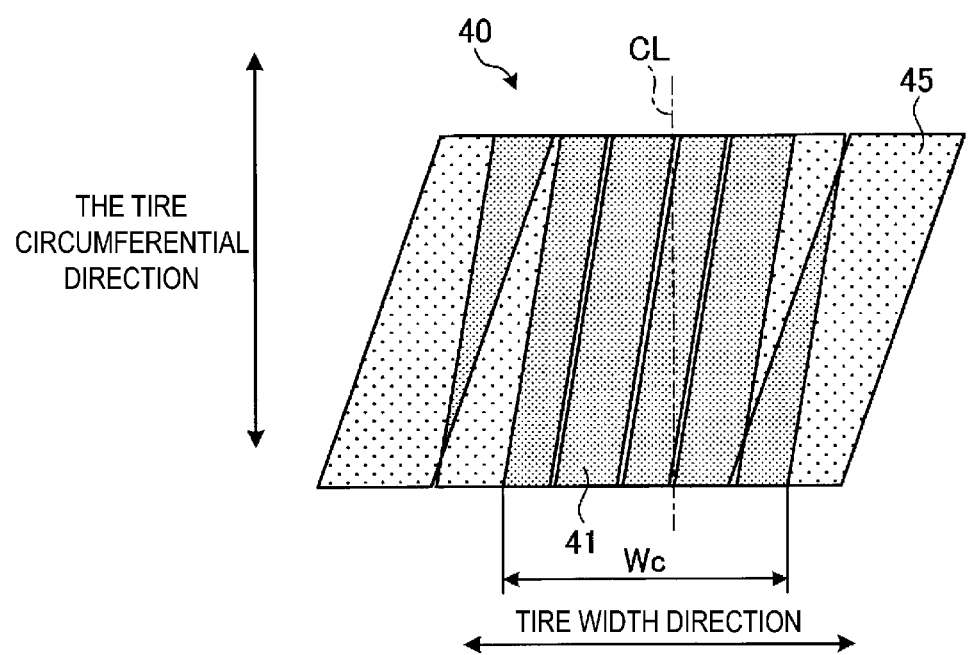
FIG. 10 is a schematic view of a belt reinforcing layer in the direction of an arrow E-E in FIG. 9.

Note that in the embodiment described above, the belt reinforcing layer 40 is formed by winding the pair of band-like members 45 in a spiral shape, but the belt reinforcing layers 40 may be formed in other forms. FIG. 9 is a modified example of the run-flat tire 1 according to the embodiment and is a meridian cross-sectional view of the center region Ac of the tread portion 2. FIG. 10 is a schematic view of the belt reinforcing layer 40 in the direction of an arrow E-E in FIG. 9. As illustrated in FIGS. 9 and 10, for example, the belt reinforcing layer 40 may be disposed such that the pair of band-like members 45 are wound in a spiral shape about the tire rotation axis, from one end 46 portion (see FIG. 2) in the tire width direction of the belt reinforcing layer 40 to the other end portion 46. In this case, the center reinforcing portion 41 is formed in such a way that the inclination angle of the spirals of the band-like members 45 in the tire width direction with respect to the tire circumferential direction decreases at the position at or near the tire equatorial plane CL or in the center region Ac, whereby the band-like members 45 of adjacent windings of the spiral is formed by overlapping in the tire radial direction.

In other words, the band-like member 45 wound in a spiral shape is disposed such that portions of the band-like members 45 having different windings of the spiral do not overlap at the position other than the center region Ac, whereas portions of the band-like members 45 having different windings of the spiral overlap and are stacked in the tire radial direction at the position of the center region Ac. Due to this, in the belt reinforcing layer 40, more band-like members 45 can be stacked at the position of the center region Ac than positions other than the center region Ac, and the center reinforcing portion 41 can be formed at the position of the center region Ac.

Alternatively, in the belt reinforcing layer 40, one band-like member 45 may be disposed, from one end portion 46 in the tire width direction of the belt reinforcing layer 40 to the other end portion 46, and another band-like member 45 other than the one band-like member 45 may be disposed in the center region Ac only, so that the center reinforcing portion 41 is formed at the position of the center region Ac. As described above, a method of forming the belt reinforcing layer 40 is not particularly limited as long as the center reinforcing portion 41 can be formed by stacking more band-like members 45 at the position than at positions other than the center region Ac.

In the above-described embodiment, although the belt reinforcing layer 40 is formed by one band-like member 45 in portions other than the center reinforcing portion 41 and is formed by stacking two band-like members 45 in the center reinforcing portion 41, the number of band-like members 45 that constitute the belt reinforcing layer 40 is not limited thereto. For example, the belt reinforcing layer 40 may be formed by stacking two band-like members 45 in the portions other than the center reinforcing portion 41 and stacking three band-like members 45 in the center reinforcing portion 41. As long as the number of the band-like members 45 of the center reinforcing portion 41 is greater than the number of band-like members 45 in portions other than the center reinforcing portion 41, the number of belt reinforcing layers 40 is not particularly limited.

Figure 11:
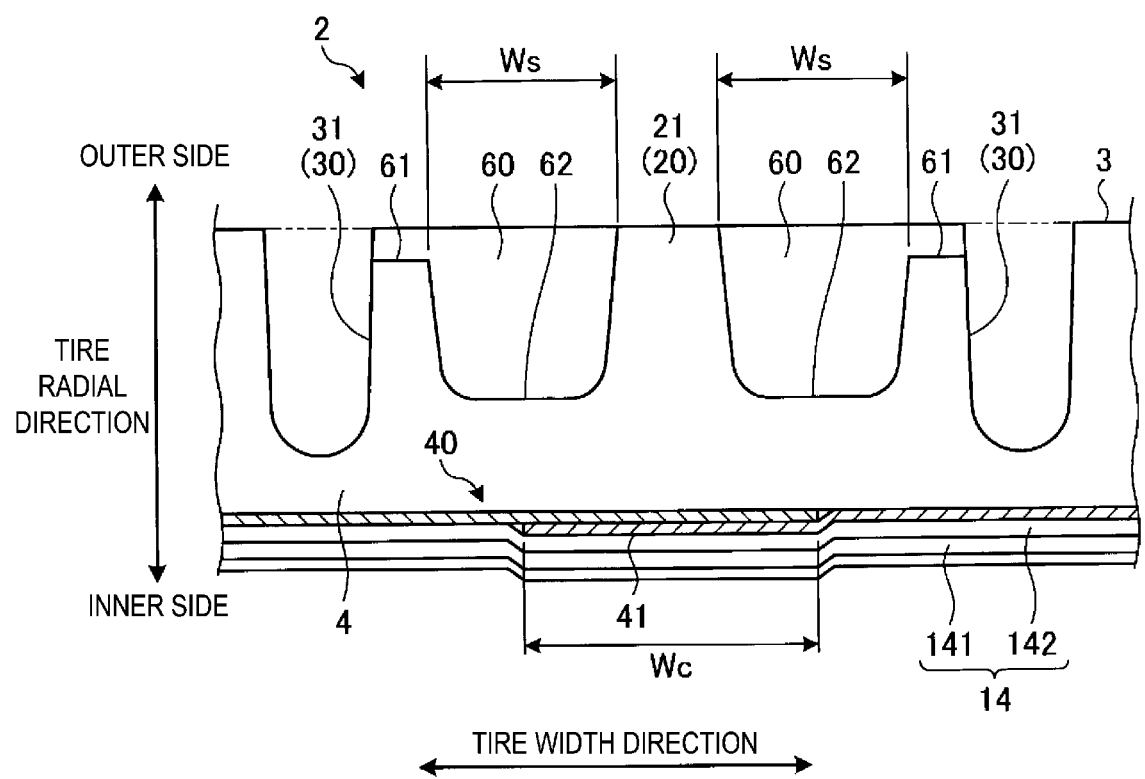
FIG. 11 is a modified example of a run-flat tire according to an embodiment and is a meridian cross-sectional view of a center block at a position where sipes are formed.

Moreover, in the embodiment described above, the sipes 60 formed in the center block 21 are open sipes in which both ends are open to the center main groove 31, but both ends of the sipes 60 formed in the center block 21 may not be open to the center main groove 31. FIG. 11 is a modified example of the run-flat tire 1 according to the embodiment and is a meridian cross-sectional view of the center block 21 at the position where the sipes 60 are formed. As illustrated in FIG. 11, for example, the sipes 60 formed in the center block 21 may have one end open to the center main groove 31 and the other end terminating within the center block 21. Even when the end portion of the sipes 60 formed in the center block 21 terminate within the center block 21 in this manner, the center reinforcing portion 41 of the belt reinforcing layer 40 is preferably disposed so as to overlap the deepest sipe depth position of the sipes 60 formed in the center block 21 in the tire radial direction. When the end portion of the sipes 60 formed in the center block 21 terminates within the center block 21, the average width of the width We in the tire width direction of the center reinforcing portion 41 is preferably 50% or greater of the width Ws in the tire width direction of the deep bottom portion 62 of the sipe 60.

In the above-described embodiment, four main grooves 30 are formed, but the number of main grooves 30 may be other than four. In the embodiment described above, the center region Ac coincides with the range in the tire width direction of the center block 21, which is the block 20 located on the tire equatorial plane CL, but the center region Ac may not be located on the tire equatorial plane CL. For example, when the main groove 30 is located on the tire equatorial plane CL, the center region Ac may be a range in the tire width direction of the block 20 defined by the main groove 30 located on the tire equatorial plane CL and another main groove 30 that is close to the tire equatorial plane CL next to the main groove 30. In other words, among the regions sandwiched by two adjacent main grooves 30, the region closest to the tire equatorial plane CL may be used as the center region Ac.

Examples

FIGS. 12A and 12B are tables illustrating the results of performance evaluation tests of run-flat tires. Hereinafter, performance evaluation tests performed on the run-flat tire of Conventional Example, the run-flat tire 1 according to an embodiment of the present technology, and the run-flat tire of Comparative Example compared to the run-flat tire 1 according to an embodiment of the present technology will be described below. Performance evaluation tests are performed on the shock burst resistance which is durability against shock bursts and the performance on ice indicating the running performance on icy road surfaces.

The performance evaluation tests are performed using the run-flat tire 1 having the nominal size of 245/50R19 105W defined by JATMA and mounted on a standard rim wheel of JATMA having a rim size of 19×7.5 J. The evaluation method for each of the test items is evaluated for the shock burst resistance by filling the test tire with an air pressure of 220 kPa, performing a plunger breakage test, in accordance with JIS K6302 with a plunger diameter of 19 mm and an insertion speed of 50 mm/minute, and measuring the tire breakage energy. Shock burst resistance is expressed as an index value, with respect to 100 of Conventional Example described below, and the larger the index value, the better the shock burst resistance.

Moreover, performance on ice is evaluated by sensory evaluation of a test driver when a test vehicle having the test tire mounted thereon travels on a test course of icy road surfaces, and the sensory evaluation is evaluated and expressed as an index value, with respect to 100 of Conventional Example. The larger the value, the superior the steering stability during running on icy road surfaces and the better the performance on ice.

The performance evaluation tests are performed on 16 types of run-flat tires including: a run-flat tire of Conventional Example, which is an example of a known run-flat tire, Examples 1 to 11, which are the run-flat tires 1 according to an embodiment of the present technology, and Comparative Examples 1 to 4, which are run-flat tires compared to the run-flat tire 1 according to an embodiment of the present technology. Among these run-flat tires, in the run-flat tire of Conventional Example, the belt reinforcing layer 40 does not have the center reinforcing portion 41 in which the number of stacked band-like members 45 is larger than that of the other positions.

In the run-flat tires of Comparative Examples 1 and 2, the width Wc of the center reinforcing portion 41 in the tire width direction is not within a range of 0.5 Gr≤Wc≤2.5 Gr with respect to the thickness Gr of the side reinforcing rubber 50 at the tire maximum width position P, and the average width of the width Wc of the center reinforcing portion 41 with respect to the width WL in the tire width direction of the center block 21 is not within a range from 50% or greater to 90% or smaller. In the run-flat tires of Comparative Examples 3 and 4, the density in the tire circumferential direction of the sipes 60 formed in the center block 21 is not within a range from 0.10 cords/mm or greater to 0.30 cords/mm or smaller.

In contrast, in Examples 1 to 11 which are examples of the run-flat tire 1 according to an embodiment of the present technology, all the belt reinforcing layers 40 include the center reinforcing portion 41, and the width Wc of the center reinforcing portion 41 in the tire width direction is within a range of 0.5 Gr≤Wc≤2.5 Gr with respect to the thickness Gr of the side reinforcing rubber 50 at the tire maximum width position P, and the density of the sipes 60 formed in the center block 21 is within a range from 0.10 cords/mm or greater to 0.30 cords/mm or smaller. Furthermore, in the run-flat tires 1 according to Examples 1 to 11, the form of the center reinforcing portion 41; the width Wc of the center reinforcing portion with respect to the width Ws of the deep bottom portion 62 of the sipe 60; the thickness Tu of the undertread 6 with respect to the thickness Tc of the tread rubber layer 4; and the minimum thickness Tg (Tg/Tc) of the rubber thickness between the belt layer 14 and the groove bottom 36 of the center main groove 31 with respect to the average thickness Tc of the tread rubber layer 4, in the center block 21, on the outer side in the tire radial direction of the belt reinforcing layer 40 are different.

As the result of the performance evaluation tests performed using these run-flat tires 1, as illustrated in FIGS. 12A and 12B, it is found that the run-flat tires 1 according to Examples 1 to 11 can improve the shock burst resistance without degrading the performance on ice as compared to the Conventional Examples. In other words, the run-flat tires 1 according to Examples 1 to 11 can improve the shock burst resistance without degrading the performance on ice.

The invention claimed is:

1. A run-flat tire, comprising:
a tread portion;
a plurality of blocks defined in the tread portion by a plurality of main grooves and a plurality of lug grooves formed in the tread portion;
a plurality of sipes formed in the plurality of blocks to extend in a tire width direction;
a sidewall portion disposed on both sides in the tire width direction of the tread portion;
a belt layer disposed in the tread portion;
a belt reinforcing layer disposed on an outer side in a tire radial direction of the belt layer;
a tread rubber layer disposed on an outer side in the tire radial direction of the belt reinforcing layer in the tread portion; and
a side reinforcing rubber disposed in the sidewall portion,
a density in a tire circumferential direction of the plurality of sipes formed in a center block which is the block closest to a tire equatorial plane among the plurality of blocks being larger than a density in the tire circumferential direction of the plurality of sipes formed in shoulder blocks which are the blocks located on outermost sides in the tire width direction,
a density in the tire circumferential direction of the plurality of sipes formed in the center blocks being within a range from 0.10 sipes/mm or greater to 0.30 sipes/mm or smaller,
a width in the tire width direction of the center block being within a range from 7% or greater to 20% or smaller of a development width of the tread portion,
the belt reinforcing layer comprising a center reinforcing portion, which is a portion in which more belt reinforcing layers are stacked at a position of a center region, which is a region in the tire width direction where the center block is located, than at positions other than the center region,
a width Wc in the tire width direction of the center reinforcing portion of the belt reinforcing layer being within a range of 0.5 Gr≤Wc≤2.5 Gr with respect to a thickness Gr of the side reinforcing rubber at a tire maximum width position, and
an average width of the width Wc of the center reinforcing portion being within a range from 50% or greater to 90% or smaller of a width in the tire width direction of the center block.

2. The run-flat tire according to claim 1, wherein
the center reinforcing portion is disposed to overlap a deepest depth position of the plurality of sipes formed in the center blocks in the tire radial direction.

3. The run-flat tire according to claim 1, wherein
the tread portion is configured such that a relationship between a minimum thickness Tg of a rubber thickness between the belt reinforcing layer and a groove bottom of the plurality of main grooves defining the center block and an average thickness Tc of the tread rubber layer, in the center block, on the outer side in the tire radial direction of the belt reinforcing layer is within a range of 0.12≤(Tg/Tc)≤0.4.

4. The run-flat tire according to claim 1, wherein a position in the tire width direction of the center reinforcing portion varies along the tire circumferential direction.

5. The run-flat tire according to claim 1, wherein
the tread rubber layer comprises: a cap tread and an undertread disposed on an inner side in the tire radial direction of the cap tread, and
a modulus at 300% elongation of the cap tread is within a range from 4.0 MPa or greater to 10.0 MPa or smaller, and a modulus at 300% elongation of the undertread is within a range from 10.0 MPa or greater to 15.0 MPa or smaller.

6. The run-flat tire according to claim 5, wherein a thickness of the undertread in the tire radial direction at a position of the center block is within a range from 50% or greater to 80% or smaller of a thickness of the tread rubber layer in the tire radial direction at the position of the center block.

7. The run-flat tire according to claim 1, wherein the center reinforcing portion of the belt reinforcing layer is formed so as to protrude to an inner side in the tire radial direction.

8. The run-flat tire according to claim 7, wherein the tread rubber layer comprises: a cap tread and an undertread disposed on an inner side in the tire radial direction of the cap tread, and a modulus at 300% elongation of the cap tread is within a range from 4.0 MPa or greater to 10.0 MPa or smaller, and a modulus at 300% elongation of the undertread is within a range from 10.0 MPa or greater to 15.0 MPa or smaller.

9. The run-flat tire according to claim 8, wherein a thickness of the undertread in the tire radial direction at a position of the center block is within a range from 50% or greater to 80% or smaller of a thickness of the tread rubber layer in the tire radial direction at the position of the center block.

10. The run-flat tire according to claim 9, wherein the center reinforcing portion is disposed to overlap a deepest depth position of the plurality of sipes formed in the center blocks in the tire radial direction.

11. The run-flat tire according to claim 10, wherein the tread portion is configured such that a relationship between a minimum thickness Tg of a rubber thickness between the belt reinforcing layer and a groove bottom of the plurality of main grooves defining the center block and an average thickness Tc of the tread rubber layer, in the center block, on the outer side in the tire radial direction of the belt reinforcing layer is within a range of $0.12 \leq (Tg/Tc) \leq 0.4$.

* * * * *